(12) United States Patent
Ihara et al.

(10) Patent No.: US 8,377,597 B2
(45) Date of Patent: *Feb. 19, 2013

(54) ELECTROLYTIC SOLUTION AND SECONDARY BATTERY

(75) Inventors: Masayuki Ihara, Fukushima (JP); Hiroyuki Yamaguchi, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 776 days.

This patent is subject to a terminal disclaimer.

(21) Appl. No.: 12/398,317

(22) Filed: Mar. 5, 2009

(65) Prior Publication Data

US 2009/0233179 A1    Sep. 17, 2009

(30) Foreign Application Priority Data

Mar. 17, 2008   (JP) ................. 2008-068266

(51) Int. Cl.
*H01M 6/16* (2006.01)

(52) U.S. Cl. ........ 429/330; 429/327; 429/329; 429/331; 429/332; 429/340; 429/341; 429/314; 429/199; 429/200; 429/218.1; 429/221; 429/223; 429/231; 429/220

(58) Field of Classification Search .................. 429/330, 429/327, 329, 331, 332, 340, 341, 314, 199, 429/200, 218.1, 221, 223, 231, 220
See application file for complete search history.

(56) References Cited

U.S. PATENT DOCUMENTS

| 8,221,656 B2 * | 7/2012 | Ihara et al. ..................... 429/336 |
| 2006/0115739 A1 | 6/2006 | Yamaguchi et al. |
| 2006/0228625 A1 | 10/2006 | Kawashima |

FOREIGN PATENT DOCUMENTS

| JP | 2002-028718 | 1/2002 |
| JP | 2004-022336 | 1/2004 |
| JP | 2006-156331 | 6/2006 |
| JP | 2006-294373 | 10/2006 |
| JP | 2006-294519 | 10/2006 |
| JP | 2007-273394 | 10/2007 |
| JP | 2007-273396 | 10/2007 |
| KR | 2002-0041646 | * 11/2000 |
| KR | 2002-0041646 | 3/2002 |

* cited by examiner

*Primary Examiner* — Laura Weiner
(74) *Attorney, Agent, or Firm* — SNR Denton US LLP

(57) ABSTRACT

A secondary battery capable of improving the cycle characteristics and the storage characteristics is provided. The battery includes a cathode, an anode, and an electrolytic solution. The electrolytic solution contains a solvent contains a sulfone compound having a structure in which —S(=O)$_2$—S—C (=O)— bond is introduced to a benzene skeleton and an ester carbonate halide.

14 Claims, 8 Drawing Sheets

ELECTROLYTIC SOLUTION AND SECONDARY BATTERY

CROSS REFERENCES TO RELATED APPLICATIONS

The present invention contains subject matter related to Japanese Patent Application JP 2008-068266 filed in the Japanese Patent Office on Mar. 17, 2008, the entire contents of which being incorporated herein by reference.

BACKGROUND OF THE INVENTION

1. Field of the Invention

The present invention relates to an electrolytic solution containing a solvent and a secondary battery using it.

2. Description of the Related Art

In recent years, portable electronic devices such as combination cameras (videotape recorder), mobile phones, and notebook personal computers have been widely used, and it is strongly demanded to reduce their size and weight and to achieve their long life. Accordingly, as a power source of the portable electronic devices, a battery, in particular a lightweight secondary batter capable of providing a high energy density has been developed.

Specially, a secondary battery using insertion and extraction of lithium for charge and discharge reaction (so-called lithium ion secondary battery) and a secondary battery using precipitation and dissolution of lithium (so-called lithium metal secondary battery) are extremely prospective, since such a secondary battery is able to provide a higher energy density compared to a lead battery and a nickel cadmium battery.

For a composition of the electrolytic solution used for the secondary batteries, to improve the battery characteristics such as cycle characteristics, technologies using a compound having a sulfonyl group (—S(=O)$_2$—) (sulfone compound) have been proposed. As the sulfone compound, a chain or cyclic compound having —S(=O)$_2$—O—C(=O)— bond (an anhydride of sulfonic acid and carboxylic acid: for example, refer to Japanese Unexamined Patent Application Publication No. 2002-008718), a cyclic compound having —S(=O)$_2$—O—S(=O)$_2$— bond (disulfonic acid anhydride: for example, refer to Japanese Unexamined Patent Application Publication No. 2004-022336), a cyclic compound having —S(=O)$_2$—S—C(=O)— bond (for example, refer to Korean Unexamined Patent Application Publication No. 2002-0041646) and the like have been used.

SUMMARY OF THE INVENTION

In these years, the high performance and the multi functions of the portable electronic devices are increasingly developed, and the electric power consumption tends to be increased. Accordingly, charge and discharge of the secondary battery are frequently repeated, and thus the cycle characteristics tend to be easily lowered. In addition, the portable electronic devices are widely prevalent in various fields. Thus, in transport time, in use, in carrying them or the like, the secondary battery may be exposed in high temperature atmosphere, and therefore the storage characteristics are in a state of being easily lowered. Accordingly, further improvement of the cycle characteristics and the storage characteristics of the secondary battery has been aspired.

In view of the foregoing, in the invention, it is desirable to provide an electrolytic solution and a secondary battery that are capable of improving the cycle characteristics and the storage characteristics.

According to an embodiment of the invention, there is provided an electrolytic solution that contains a solvent containing a sulfone compound shown in Chemical formula 1 and at least one of a chain ester carbonate having halogen shown in Chemical formula 2 and a cyclic ester carbonate having halogen shown in Chemical formula 3.

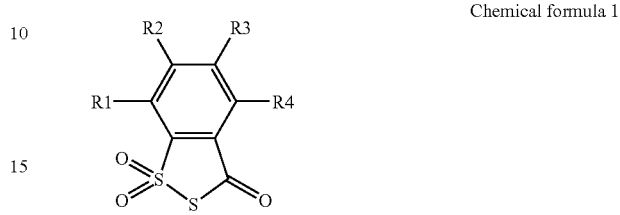

Chemical formula 1

(R1 to R4 are a hydrogen group, a halogen group, an alkyl group, an alkyl halide group, an alkoxy group, or an alkoxy halide group.)

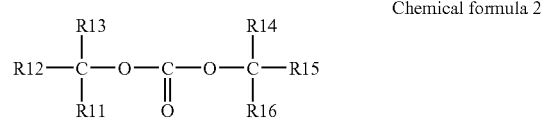

Chemical formula 2

(R11 to R16 are a hydrogen group, a halogen group, an alkyl group, or an alkyl halide group. At least one of R11 to R16 is the halogen group or the alkyl halide group.)

Chemical formula 3

(R17 to R20 are a hydrogen group, a halogen group, an alkyl group, or an alkyl halide group. At least one of R17 to R20 is the halogen group or the alkyl halide group.)

According to an embodiment of the invention, there is provided a secondary battery including a cathode, an anode, and an electrolytic solution. The electrolytic solution contains a solvent containing a sulfone compound shown in Chemical formula 1 and at least one of a chain ester carbonate having halogen shown in Chemical formula 2 and a cyclic ester carbonate having halogen shown in Chemical formula 3.

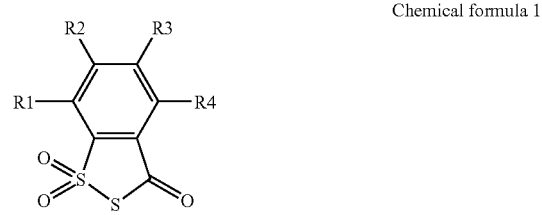

Chemical formula 1

(R1 to R4 are a hydrogen group, a halogen group, an alkyl group, an alkyl halide group, an alkoxy group, or an alkoxy halide group.)

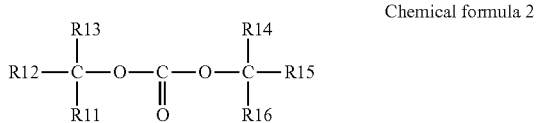

Chemical formula 2

(R11 to R16 are a hydrogen group, a halogen group, an alkyl group, or an alkyl halide group. At least one of R11 to R16 is the halogen group or the alkyl halide group.)

Chemical formula 3

(R17 to R20 are a hydrogen group, a halogen group, an alkyl group, or an alkyl halide group. At least one of R17 to R20 is the halogen group or the alkyl halide group.)

According to the electrolytic solution of the embodiment of the invention, the solvent contains the sulfone compound shown in Chemical formula 1 and at least one of the chain ester carbonate having halogen shown in Chemical formula 2 and the cyclic ester carbonate having halogen shown in Chemical formula 3, and thus the chemical stability is improved. Thereby, according to the secondary battery including the electrolytic solution of the embodiment of the invention, decomposition reaction of the electrolytic solution in charge and discharge is inhibited, and thus the cycle characteristics and the storage characteristics are able to be improved.

Other and further objects, features and advantages of the invention will appear more fully from the following description.

DETAILED DESCRIPTION OF THE PREFERRED EMBODIMENT

Figure 1:
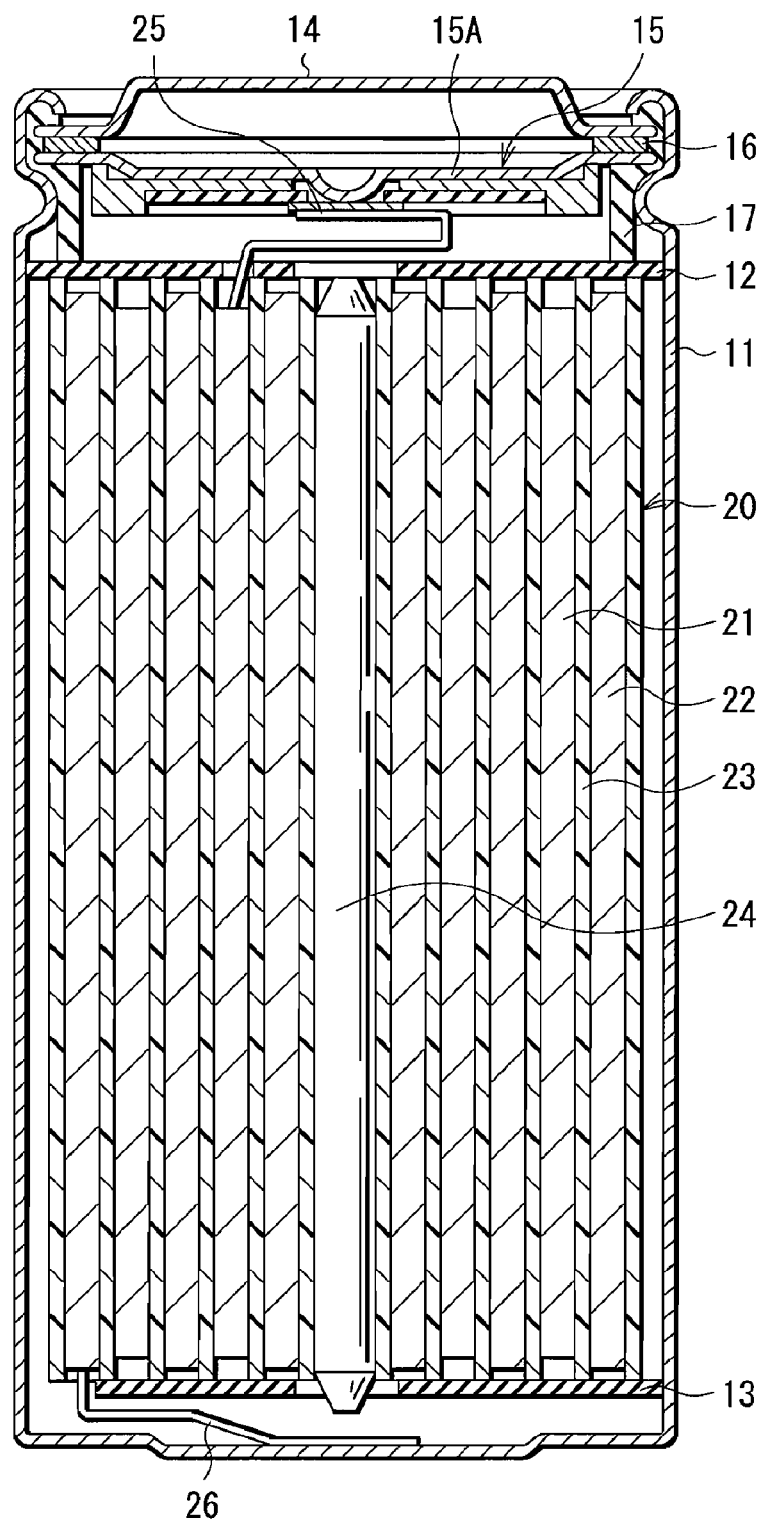
FIG. 1 is a cross sectional view showing a structure of a first secondary battery including an electrolytic solution according to an embodiment of the invention.

An embodiment of the invention will be hereinafter described in detail with reference to the drawings.

An electrolytic solution according to the embodiment of the invention is used for an electrochemical device such as a secondary battery. The electrolytic solution contains a solvent and an electrolyte salt dissolved therein.

The solvent contains a sulfone compound shown in Chemical formula 1 (hereinafter simply referred to as "sulfone compound") and at least one of a chain ester carbonate having halogen as an element shown in Chemical formula 2 and a cyclic ester carbonate having halogen as an element shown in Chemical formula 3 (hereinafter simply and collectively referred to as "ester carbonate halide"). Since the solvent contains the sulfone compound and the ester carbonate halide together, compared to a case that the solvent contains neither thereof or a case that the solvent contains only one thereof, the chemical stability of the electrolytic solution is improved. Thereby, in the case where the electrolytic solution is used for an electrochemical device, decomposition reaction of the electrolytic solution is inhibited in electrode reaction.

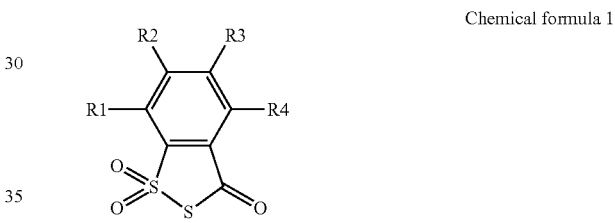

Chemical formula 1

(R1 to R4 are a hydrogen group, a halogen group, an alkyl group, an alkyl halide group, an alkoxy group, or an alkoxy halide group.)

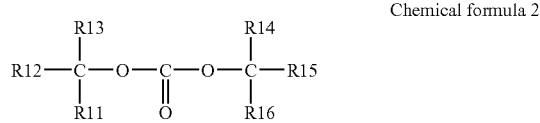

Chemical formula 2

(R11 to R16 are a hydrogen group, a halogen group, an alkyl group, or an alkyl halide group. At least one of R11 to R16 is the halogen group or the alkyl halide group.)

Chemical formula 3

(R17 to R20 are a hydrogen group, a halogen group, an alkyl group, or an alkyl halide group. At least one of R17 to R20 is the halogen group or the alkyl halide group.)

The sulfone compound shown in Chemical formula 1 is a compound in which —S(=O)$_2$—S—C(=O)— bond is introduced to a benzene skeleton. The sulfone compound preferentially decomposes itself in electrode reaction, and thereby fulfills a function to inhibit decomposition reaction of other solvent or the like in the electrolytic solution. Details of R1 to R4 in Chemical formula 1 are as follows.

R1 to R4 may be identical or different. That is, types of R1 to R4 may be individually set in the foregoing range of the series of groups.

The carbon number of the alkyl group, the alkyl halide group, the alkoxy group, or the alkoxy halide group is not particularly limited, but is preferably small as much as possible, since thereby the solubility and compatibility are improved and such a group is stably mixed with an organic solvent or the like. Specially, the carbon number of the alkyl group or the like is preferably 2 or less, since thereby superior solubility and superior compatibility are obtained. The alkyl group or the like with the carbon number of 2 or less is a methyl group, an ethyl group, a methyl halide group, an ethyl halide group, a methoxy group, an ethoxy group, a methoxy halide group, or an ethoxy halide group.

The halogen group type is not particularly limited, but is preferably a fluorine group (—F), since thereby higher effect is obtained compared to other halogen group such as a chlorine group (—Cl).

"Alkyl halide group" or "alkoxy halide group" is a group obtained by substituting at least partial hydrogen out of an alkyl group or an alkoxy group with halogen. The halogen type is preferably a fluorine as in the halogen group type described above.

The molecular weight of the sulfone compound is not particularly limited, but is preferably in the range from 200 to 800, and more preferably in the range from 200 to 600, and much more preferably in the range from 200 to 450. Thereby, the solubility and the compatibility may be higher compared to a case that the molecular weight is out of the foregoing ranges.

As a specific example of the sulfone compound, compounds shown in Chemical formulas 4-(1) to 6-(5) are cited. R1 to R4 types shown in Chemical formulas 4-(1) to 6-(5) are as follows. In Chemical formula 4-(1), only the hydrogen group is applied. In Chemical formulas 4-(2) to 4-(4), the hydrogen group and the halogen group (fluorine group) are applied. In Chemical formula 4-(5), only the halogen group (fluorine group) is applied. In Chemical formulas 4-(6), the hydrogen group and the halogen group (chlorine group) are applied. In Chemical formulas 5-(1) to 5-(5), the hydrogen group and the alkyl group (methyl group or ethyl group) are applied. In Chemical formulas 5-(6) and 5-(7), the hydrogen group and the alkyl halide group (trifluoro methyl group or pentafluoro ethyl group) are applied. In Chemical formulas 6-(1) and 6-(2), the hydrogen group and the alkoxy group (methoxy group or ethoxy group) are applied. In Chemical formula 6-(3), the hydrogen group, the alkyl group (methyl group), and the alkoxy group (methoxy group) are applied. In Chemical formulas 6-(4) and 6-(5), the hydrogen group and the alkoxy halide group (trifluoromethoxy group or pentafluoroethoxy group) are applied. The compounds shown in Chemical formulas 4-(1) to 6-(5) include a geometric isomer.

Chemical formula 4

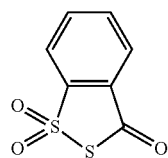
(1)

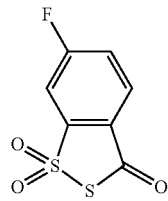
(2)

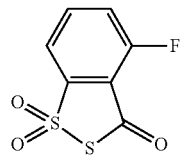
(3)

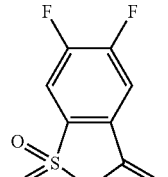
(4)

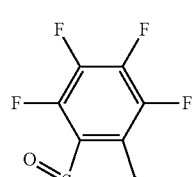
(5)

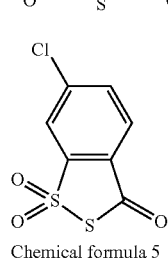
(6)

Chemical formula 5

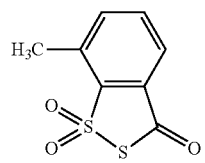
(1)

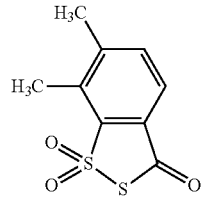
(2)

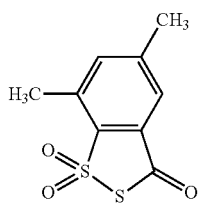
(4)

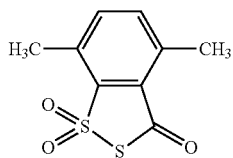
(5)

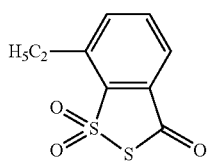
(6)

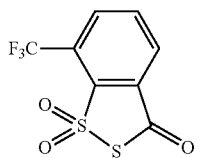

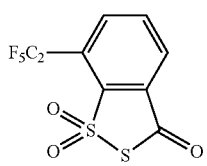

Chemical formula 6

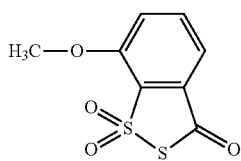
(1)

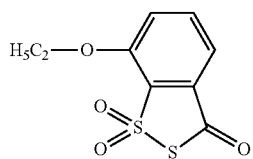
(2)

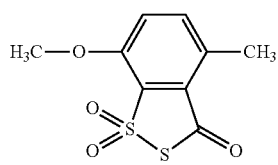
(3)

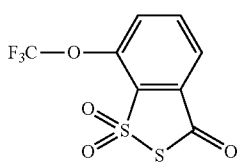
(4)

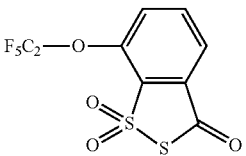
(5)

The content of the sulfone compound in the solvent is not particularly limited, but is preferably in the range from 0.01 wt % to 5 wt %, since thereby a superior battery capacity, superior cycle characteristics, and superior storage characteristics are obtained. More specifically, in the case where the content is smaller than 0.01 wt %, there is a possibility that the chemical stability of the electrolytic solution is not sufficiently and stably obtained. Meanwhile, in the case where the content is larger than 5 wt %, the battery capacity may be lowered.

The series of compounds described as a sulfone compound may be used singly, or a plurality of the compounds may be used by mixture. It is needless to say that the sulfone compound is not limited to the compounds shown in Chemical formulas 4-(1) to 6-(5), as long as the sulfone compound has the structure shown in Chemical formula 1.

The ester carbonate halide fulfills a function to inhibit decomposition of the electrolytic solution mainly by forming a stable protective film on the surface of an electrode in electrode reaction. Details of R11 to R20 in Chemical formula 2 and Chemical formula 3 are as follows.

R11 to R16 in Chemical formula 2 may be identical or different. That is, types of R11 to R16 may be individually set in the foregoing range of the series of groups. The same is applied to R17 to R20 in Chemical formula 3.

The halogen type is not particularly limited, but fluorine, chlorine, or bromine is preferable, and fluorine is more preferable since thereby higher effect is obtained compared to other halogen.

The meaning of the alkyl halide group is similar to that of the case described for R1 to R4 in Chemical formula 1. The number of halogen is more preferably two than one, and further may be three or more, since thereby an ability to form a protective film is improved and a more rigid and stable protective film is formed. Accordingly, decomposition reaction of the electrolytic solution is more inhibited.

As the chain ester carbonate having halogen shown in Chemical formula 2, for example, fluoromethyl methyl carbonate, bis(fluoromethyl) carbonate, difluoromethyl methyl carbonate and the like are cited. One thereof may be used singly, or a plurality thereof may be used by mixture. Specially, bis(fluoromethyl) carbonate is preferable, since thereby high effect is obtained.

As the cyclic ester carbonate having halogen shown in Chemical formula 3, for example, the series of compounds shown in Chemical formulas 7-(1) to 8-(9) are cited. That is, 4-fluoro-1,3-dioxolane-2-one of Chemical formula 7-(1), 4-chloro-1,3-dioxolane-2-one of Chemical formula 7-(2), 4,5-difluoro-1,3-dioxolane-2-one of Chemical formula 7-(3), tetrafluoro-1,3-dioxolane-2-one of Chemical formula 7-(4), 4-chloro-5-fluoro-1,3-dioxolane-2-one of Chemical formula 7-(5), 4,5-dichloro-1,3-dioxolane-2-one of Chemical formula 7-(6), tetrachloro-1,3-dioxolane 2-one of Chemical formula 7-(7), 4,5-bis trifluoro methyl-1,3-dioxolane 2-one of Chemical formula 7-(8), 4-trifluoro methyl-1,3-dioxolane-2-one of Chemical formula 7-(9), 4,5-difluoro-4,5-dimethyl-1,3-dioxolane-2-one of Chemical formula 7-(10), 4,4-difluoro- 5-methyl-1,3-dioxolane-2-one of Chemical formula 7-(11), 4-ethyl-5,5-difluoro-1,3-dioxolane-2-one of Chemical formula 7-(12) and the like are cited. Further, 4-fluoro-5-trifluoromethyl-1,3-dioxolane-2-one of Chemical formula 8-(1), 4-methyl-5-trifluoromethyl-1,3-dioxolane-2-one of Chemical formula 8-(2), 4-fluoro-4,5-dimethyl-1,3-dioxolane-2-one of Chemical formula 8-(3), 5-(1,1-difluoroethyl)-4,4-difluoro-1,3-dioxolane-2-one of Chemical formula 8-(4), 4,5-dichloro-4,5-dimethyl-1,3-dioxolane-2-one of Chemical formula 8-(5), 4-ethyl-5-fluoro-1,3-dioxolane-2-one of Chemical formula 8-(6), 4-ethyl-4,5-difluoro-1,3-dioxolane-2-one of Chemical formula 8-(7), 4-ethyl-4,5,5-trifluoro-1,3-dioxolane-2-one of Chemical formula 8-(8), 4-fluoro-4-methyl-1,3-dioxolane-2-one of Chemical formula 8-(9) and the like are cited. One thereof may be used singly, or a plurality thereof may be used by mixture.

Chemical formula 7

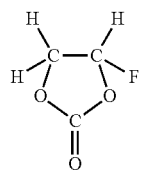
(1)

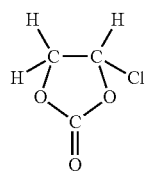
(2)

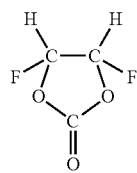
(3)

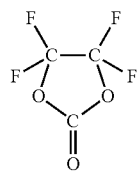
(4)

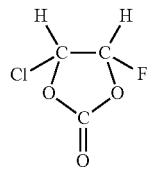
(5)

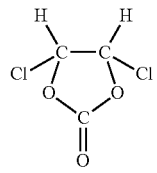
(6)

-continued

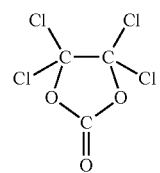
(7)

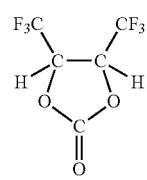
(8)

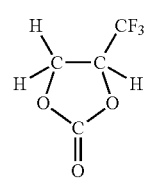
(9)

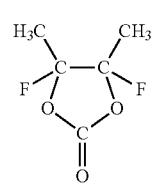
(10)

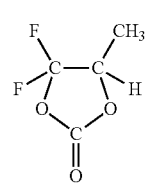
(11)

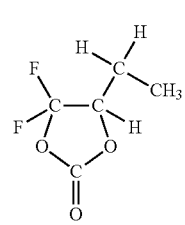
(12)

Chemical formula 8

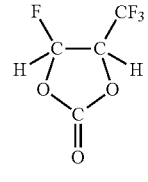
(1)

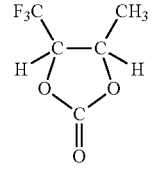
(2)

(3)
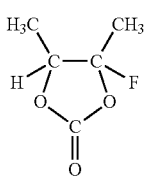

(4)
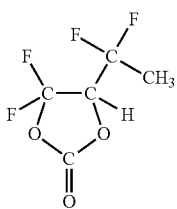

(5)
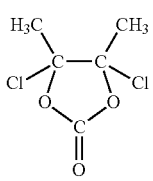

(6)
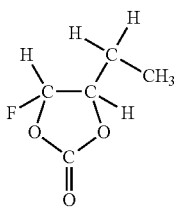

(7)
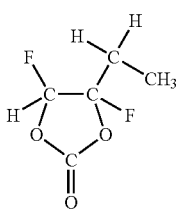

(8)
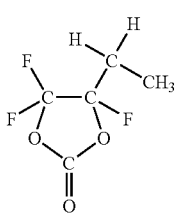

(9)
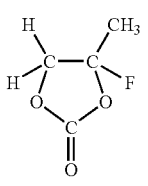

Specially, 4-fluoro-1,3-dioxolane-2-one or 4,5-difluoro-1,3-dioxolane-2-one is preferable, and 4,5-difluoro-1,3-dioxolane-2-one is more preferable. In particular, as 4,5-difluoro-1,3-dioxolane-2-one, a trans isomer is more preferable than a sis isomer, since the trans isomer is easily available and provides high effect.

The solvent may contain one or more nonaqueous solvents such as other organic solvent together with the foregoing sulfone compound and the ester carbonate halide. The following series of solvents may be combined voluntarily.

As the nonaqueous solvent, for example, ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethylacetic acid methyl, trimethylacetic acid ethyl, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide and the like are cited. Specially, at least one selected from the group consisting of ethylene carbonate, propylene carbonate, dimethyl carbonate, diethyl carbonate, and ethyl methyl carbonate is preferable. In this case, a mixture of a high viscosity (high dielectric constant) solvent (for example, specific inductive $\in \geq 30$) such as ethylene carbonate and propylene carbonate and a low viscosity solvent (for example, viscosity $\leq 1$ mPa·s) such as dimethyl carbonate, ethylmethyl carbonate, and diethyl carbonate is more preferable. Thereby, dissociation characteristics of the electrolyte salt and ion mobility are improved In particular, the solvent preferably contains a cyclic ester carbonate having an unsaturated bond shown in Chemical formula 9 to Chemical formula 11. Thereby, the chemical stability of the electrolytic solution is more improved. Such a cyclic ester carbonate having an unsaturated bond may be used singly, or a plurality thereof may be used by mixture.

Chemical formula 9

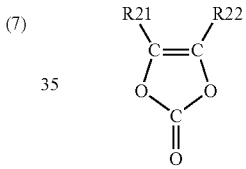

($R21$ and $R22$ are a hydrogen group or an alkyl group.)

Chemical formula 10

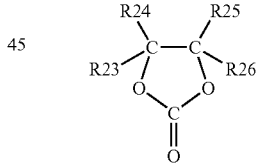

($R23$ to $R26$ are a hydrogen group, an alkyl group, a vinyl group, or an aryl group. At least one of $R23$ to $R26$ is the vinyl group or the aryl group.)

Chemical formula 11

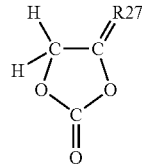

($R27$ is an alkylene group.)

The cyclic ester carbonate having an unsaturated bond shown in Chemical formula 9 is a vinylene carbonate compound. As the vinylene carbonate compound, for example, vinylene carbonate(1,3-dioxole-2-one), methylvinylene carbonate(4-methyl-1,3-dioxole-2-one), ethylvinylene carbonate(4-ethyl-1,3-dioxole-2-one), 4,5-dimethyl-1,3-dioxole-2-one, 4,5-diethyl-1,3-dioxole-2-one, 4-fluoro-1,3-dioxole-2-one, 4-trifluoromethyl-1,3-dioxole-2-one and the like are cited. Specially, vinylene carbonate is preferable, since vinylene carbonate is easily available, and provides high effect.

The cyclic ester carbonate having an unsaturated bond shown in Chemical formula 10 is a vinylethylene carbonate compound. As the vinylethylene carbonate compound, for example, vinylethylene carbonate(4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, 4,5-divinyl-1,3-dioxolane-2-one and the like are cited. Specially, vinylethylene carbonate is preferable, since vinylethylene carbonate is easily available, and provides high effect. It is needless to say that all of R23 to R26 may be the vinyl group or the aryl group. Otherwise, it is possible that some of R23 to R26 are the vinyl group, and the others thereof are the aryl group.

The cyclic ester carbonate having an unsaturated bond shown in Chemical formula 11 is a methylene ethylene carbonate compound. As the methylene ethylene carbonate compound, 4-methylene-1,3-dioxolane-2-one, 4,4-dimethyl-5-methylene-1,3-dioxolane-2-one, 4,4-diethyl-5-methylene-1,3-dioxolane-2-one and the like are cited. The methylene ethylene carbonate compound may have one methylene group (compound shown in Chemical formula 11), or have two methylene groups.

The cyclic ester carbonate having an unsaturated bond may be catechol carbonate having a benzene ring or the like, in addition to the compounds shown in Chemical formula 9 to Chemical formula 11.

Further, the solvent preferably contains sultone (cyclic sulfonic ester) and an acid anhydride, since thereby chemical stability of the electrolytic solution is more improved.

As the sultone, for example, propane sultone, propene sultone or the like is cited. Specially, propene sultone is preferable. Such sultone may be used singly, or a plurality thereof may be used by mixture. The sultone content in the solvent is, for example, in the range from 0.5 wt % to 5 wt %.

As the acid anhydride, for example, carboxylic anhydride such as succinic anhydride, glutaric anhydride, and maleic anhydride; disulfonic anhydride such as ethane disulfonic anhydride and propane disulfonic anhydride; an anhydride of carboxylic acid and sulfonic acid such as sulfobenzoic anhydride, sulfopropionic anhydride, and sulfobutyric anhydride and the like are cited. Specially, succinic anhydride or sulfobenzoic anhydride is preferable. The anhydrides may be used singly, or a plurality thereof may be used by mixture. The content of the acid anhydride in the solvent is, for example, in the range from 0.5 wt % to 5 wt %.

The electrolyte salt contains, for example, one or more light metal salts such as a lithium salt. The series of electrolyte salts described below may be combined voluntarily.

As the lithium salt, for example, lithium hexafluorophosphate, lithium tetrafluoroborate, lithium perchlorate, lithium hexafluoroarsenate, lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr) and the like are cited, since thereby superior electric performance is obtained in an electrochemical device.

Specially, at least one selected from the group consisting of lithium hexafluorophosphate, lithium tetrafluoroborate, lithium perchlorate, and lithium hexafluoroarsenate is preferable, and lithium hexafluorophosphate is more preferable, since the internal resistance is lowered, and thus higher effect is obtained.

In particular, the electrolyte salt preferably contains at least one selected from the group consisting of the compounds shown in Chemical formula 12 to Chemical formula 14. Thereby, in the case where such a compound is used together with the foregoing lithium hexafluorophosphate or the like, higher effect is obtained. R31 and R33 in Chemical formula 12 may be identical or different. The same is applied to R41 to R43 in Chemical formula 13 and R51 and R52 in Chemical formula 14.

Chemical formula 12

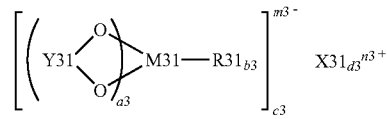

(X31 is a Group 1 element or a Group 2 element in the long period periodic table or aluminum (Al). M31 is a transition metal element, a Group 13 element, a Group 14 element, or a Group 15 element in the long period periodic table. R31 is a halogen group. Y31 is —(O═)C—R32-C(═O)—, —(O═)C—C(R33)$_2$- or —(O═)C—C(═O)—. R32 is an alkylene group, an alkylene halide group, an arylene group, or an arylene halide group. R33 is an alkyl group, an alkyl halide group, an aryl group, or an aryl halide group. a3 is one of integer numbers 1 to 4. b3 is 0, 2, or 4. c3, d3, m3, and n3 are one of integer numbers 1 to 3.)

Chemical formula 13

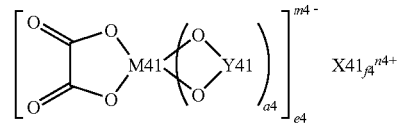

(X41 is a Group 1 element or a Group 2 element in the long period periodic table. M41 is a transition metal element, a Group 13 element, a Group 14 element, or a Group 15 element in the long period periodic table. Y41 is —(O═)C—(C(R41)$_2$)$_{b4}$-C(═O)—, —(R43)$_2$C—(C(R42)$_2$)$_{c4}$-C(═O)—, —(R43)$_2$C—(C(R42)$_2$)$_{c4}$-C(R43)$_2$-, —(R43)$_2$C—(C(R42)$_2$)$_{c4}$-S(═O)$_2$—, —(O═)$_2$S—(C(R42)$_2$)$_{d4}$-S(═O)$_2$—, or —(O═)C—(C(R42)$_2$)$_{d4}$-S(═O)$_2$—. R41 and R43 are a hydrogen group, an alkyl group, a halogen group, or an alkyl halide group. At least one of R41/R43 is respectively the halogen group or the alkyl halide group. R42 is a hydrogen group, an alkyl group, a halogen group, or an alkyl halide group. a4, c4, and n4 are an integer number of 1 or 2. b4 and d4 are one of integer numbers 1 to 4. c4 is one of integer numbers 0 to 4. f4 and m4 are one of integer numbers 1 to 3.)

Chemical formula 14

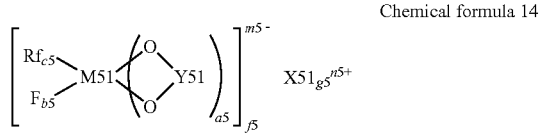

(X51 is a Group 1 element or a Group 2 element in the long period periodic table. M51 is a transition metal element, a Group 13 element, a Group 14 element, or a Group 15 element in the long period periodic table. Rf is a fluorinated alkyl group with the carbon number in the range from 1 to 10 or a fluorinated aryl group with the carbon number in the range from 1 to 10. Y51 is —(O═)C—(C(R51)$_2$)$_{d5}$-C(═O)—, —(R52)$_2$C—(C(R51)$_2$)$_{d5}$-C(═O)—, —(R52)$_2$C—(C(R51)$_2$)$_{d5}$-C(R52)$_2$-, —(R52)$_2$C—(C(R51)$_2$)$_{d5}$-S(═O)$_2$—, —(O═)$_2$S—(C(R51)$_2$)$_{e5}$-S(═O)$_2$—, or —(O═)C—(C(R51)$_2$)$_{e5}$-S(═O)$_2$—. R51 is a hydrogen group, an alkyl group, a halogen group, or an alkyl halide group. R52 is a hydrogen group, an alkyl group, a halogen group, or an alkyl halide group, and at least one thereof is the halogen group or the alkyl halide group. a5, f5, and n5 are 1 or 2. b5, c5, and e5 are one of integer numbers 1 to 4. d5 is one of integer numbers 0 to 4. g5 and m5 are one of integer numbers 1 to 3.)

The long period periodic table is shown in "Inorganic chemistry nomenclature (revised edition)" proposed by IUPAC (International Union of Pure and Applied Chemistry). Specifically, Group 1 element represents hydrogen, lithium, sodium, potassium, rubidium, cesium, and francium. Group 2 element represents beryllium, magnesium, calcium, strontium, barium, and radium. Group 13 element represents boron, aluminum, gallium, indium, and thallium. Group 14 element represents carbon, silicon, germanium, tin, and lead. Group 15 element represents nitrogen, phosphorus, arsenic, antimony, and bismuth.

As a compound shown in Chemical formula 12, for example, the compounds shown in Chemical formulas 15-(1) to 15-(6) and the like are cited. As a compound shown in Chemical formula 13, for example, the compounds shown in Chemical formulas 16-(1) to 16-(8) and the like are cited. As a compound shown in Chemical formula 14, for example, the compound shown in Chemical formula 17 and the like are cited. It is needless to say that the compound is not limited to the compounds shown in Chemical formula 15-(1) to Chemical formula 17, and the compound may be other compound as long as such a compound has the structure shown in Chemical formula 12 to Chemical formula 14.

Chemical formula 15

(1)

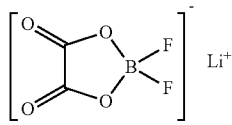

(2)

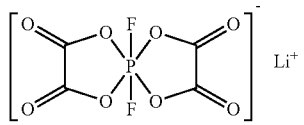

(3)

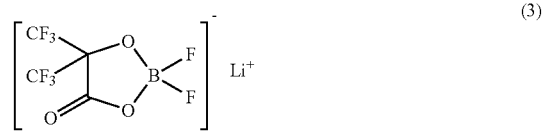

(4)

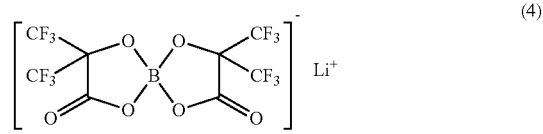

(5)

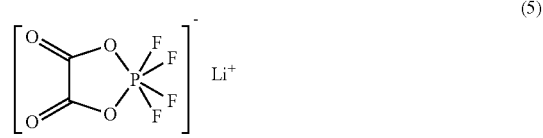

(6)

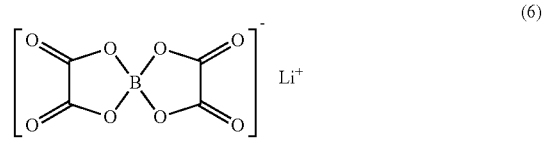

Chemical formula 16

(1)

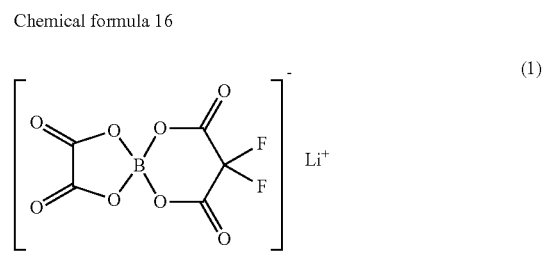

(2)

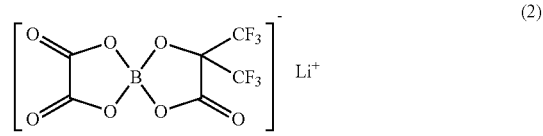

(3)

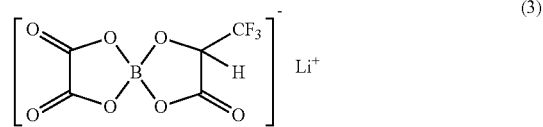

(4)

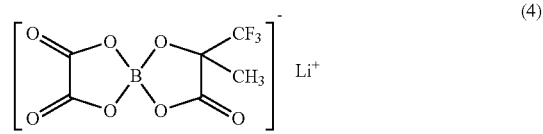

(5)

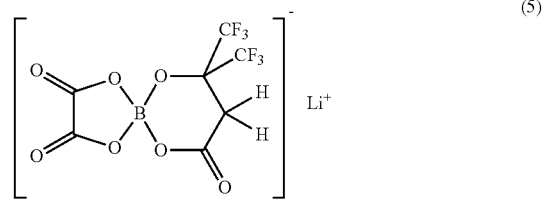

(6)

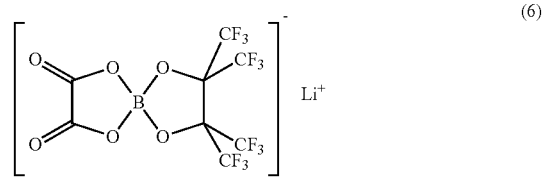

(7)
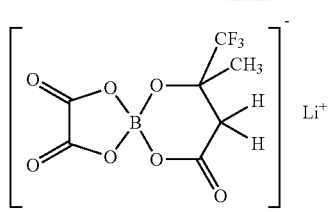

(8)
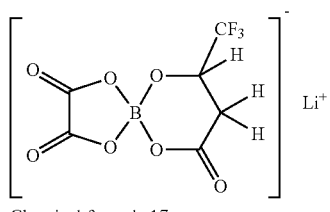

Chemical formula 17

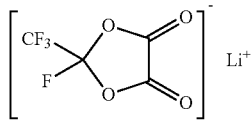

Further, the electrolyte salt may contain at least one selected from the group consisting of the compounds shown in Chemical formula 18 to Chemical formula 20. Thereby, in the case where such a compound is used together with the foregoing lithium hexafluorophosphate or the like, higher effect is obtained. m and n in Chemical formula 18 may be identical or different. The same is applied to p, q, and r in Chemical formula 20.

LiN($C_mF_{2m+1}SO_2$)($C_nF_{2n+1}SO_2$)  Chemical formula 18

(m and n are an integer number of 1 or more.)

Chemical formula 19

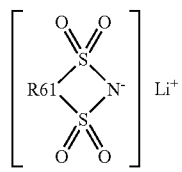

(R61 is a straight chain/branched perfluoro alkylene group with the carbon number in the range from 2 to 4.)

LiC($C_pF_{2p+1}SO_2$)($C_qF_{2q+1}SO_2$)($C_rF_{2r+1}SO_2$)  Chemical formula 20

(p, q, and r are an integer number of 1 or more.)

As the chain compound shown in Chemical formula 18, for example, lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium(trifluoromethanesulfonyl)(pentafluoroethanesulfonyl)imide (LiN(CF$_3$SO$_2$)(C$_2$F$_5$SO$_2$)), lithium(trifluoromethanesulfonyl)(heptafluoropropanesulfonyl)imide (LiN(CF$_3$SO$_2$)(C$_3$F$_7$SO$_2$)), lithium(trifluoromethanesulfonyl)(nonafluorobutanesulfonyl)imide (LiN(CF$_3$SO$_2$)(C$_4$F$_9$SO$_2$)) and the like are cited. One thereof may be used singly, or a plurality thereof may be used by mixture.

As a cyclic compound shown in Chemical formula 19, for example, the series of compounds shown in Chemical formulas 21-(1) to 21-(4) are cited. That is, lithium 1,2-perfluoroethanedisulfonylimide shown in Chemical formula 21-(1), lithium 1,3-perfluoropropanedisulfonylimide shown in Chemical formula 21-(2), lithium 1,3-perfluorobutanedisulfonylimide shown in Chemical formula 21-(3), lithium 1,4-perfluorobutanedisulfonylimide shown in Chemical formula 21-(4) and the like are cited. One thereof may be used singly, or a plurality thereof may be used by mixture. Specially, lithium 1,2-perfluoroethanedisulfonylimide is preferable, since thereby high effect is obtained.

Chemical formula 21

(1)
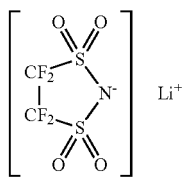

(2)
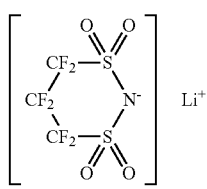

(3)
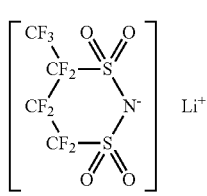

(4)
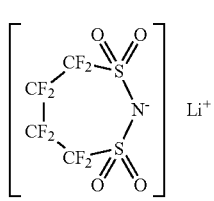

As the chain compound shown in Chemical formula 20, for example, lithium tris(trifluoromethanesulfonyl)methyde (LiC(CF$_3$SO$_2$)$_3$) and the like are cited.

The content of the electrolyte salt in relation to the solvent is preferably in the range from 0.3 mol/kg to 3.0 mol/kg. If out of the foregoing range, there is a possibility that the ion conductivity is significantly lowered.

According to the electrolytic solution, the solvent contains the sulfone compound shown in Chemical formula 1, and at least one of the chain ester carbonate having halogen shown in Chemical formula 2 and the cyclic ester carbonate having halogen shown in Chemical formula 3. In this case, compared to a case that the solvent contains neither of the foregoing sulfone compound and the foregoing ester carbonate halide, or a case that the solvent contains only one thereof, the chemical stability is improved. Thereby, in the case where the electrolytic solution is used for an electrochemical device such as a secondary battery, decomposition reaction in electrode reaction is inhibited. Accordingly, the electrolytic solution is able to contribute to improving the cycle characteristics and the storage characteristics of the electrochemical device. In this case, in the case where the content of the sulfone compound in the solvent is in the range from 0.01 wt % to 5 wt %, higher effects are able to be obtained.

In particular, in the case where the solvent contains the cyclic ester carbonate having an unsaturated bond shown in Chemical formula 9 to Chemical formula 11; sultone; or an acid anhydride, higher effect is able to be obtained.

Further, in the case where the electrolyte salt contains at least one selected from the group consisting of lithium hexafluorophosphate, lithium tetrafluoroborate, lithium perchlorate, and lithium hexafluoroarsenate; at least one selected from the group consisting of the compounds shown in Chemical formula 12 to Chemical formula 14; or at least one selected from the group consisting of the compounds shown in Chemical formula 18 to Chemical formula 20, higher effect is able to be obtained.

Next, a description will be given of a usage example of the foregoing electrolytic solution. As an example of electrochemical devices, a secondary battery is taken as an example. In this case, the electrolytic solution is used as follows.

First Secondary Battery

Figure 2:
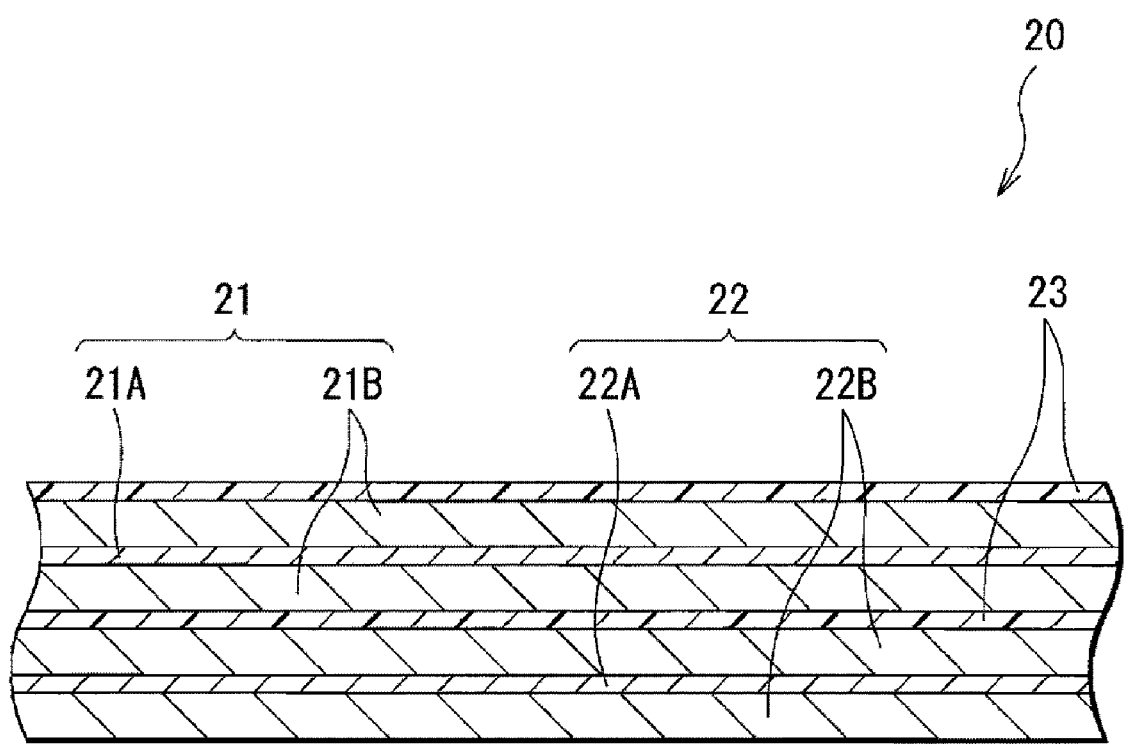
FIG. 2 is a cross sectional view showing an enlarged part of the spirally wound electrode body shown in FIG. 1.

FIG. 1 and FIG. 2 show a cross sectional structure of a first secondary battery. FIG. 2 shows an enlarged part of a spirally wound electrode body 20 shown in FIG. 1. The secondary battery herein described is a lithium ion secondary battery in which, for example, the capacity of an anode 22 is expressed based on insertion and extraction of lithium as an electrode reactant.

The secondary battery mainly contains the spirally wound electrode body 20 in which a cathode 21 and the anode 22 are layered and spirally wound with a separator 23 in between, and a pair of insulating plates 12 and 13 inside a battery can 11 in the shape of an approximately hollow cylinder. The battery structure using the cylindrical battery can 11 is a so-called cylindrical type.

The battery can 11 has, for example, a hollow structure in which one end thereof is closed and the other end thereof is opened, and is made of a metal material such as iron, aluminum, and an alloy thereof. In the case where the battery can 11 is made of iron, for example, plating by nickel or the like may be provided. The pair of insulating plates 12 and 13 is arranged to sandwich the spirally wound electrode body 20 in between from above and below and to extend perpendicularly to the spirally wound periphery face.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a metal material similar to that of the battery can 11. The safety valve mechanism 15 is electrically connected to the battery cover 14 with the PTC device 16 in between. In the safety valve mechanism 15, in the case where the internal pressure of the battery becomes a certain level or more by internal short circuit, external heating or the like, a disk plate 15A inverts to cut the electric connection between the battery cover 14 and the spirally wound electrode body 20. As temperature rises, the PTC device 16 increases the resistance and thereby limits a current to prevent abnormal heat generation resulting from a large current. The gasket 17 is made of, for example, an insulating material. The surface of the gasket 17 is coated with asphalt.

A center pin 24 may be inserted in the center of the spirally wound electrode body 20. In the spirally wound electrode body 20, a cathode lead 25 made of a metal material such as aluminum is connected to the cathode 21, and an anode lead 26 made of a metal material such as nickel is connected to the anode 22. The cathode lead 25 is electrically connected to the battery cover 14 by being welded to the safety valve mechanism 15. The anode lead 26 is electrically connected to the battery can 11 by being welded to the battery can 11.

The cathode 21 has a structure in which, for example, a cathode active material layer 21B is provided on the both faces of a cathode current collector 21A having a pair of faces. However, the cathode active material layer 21B may be provided on only a single face of the cathode current collector 21A.

The cathode current collector 21A is made of, for example, a metal material such as aluminum, nickel, and stainless.

The cathode active material layer 21B contains, as a cathode active material, one or more cathode materials capable of inserting and extracting lithium. If necessary, the cathode active material layer 21B may contain other material such as a cathode binder and a cathode electrical conductor.

As the cathode material capable of inserting and extracting lithium, for example, a lithium-containing compound is preferable, since thereby a high energy density is able to be obtained. As the lithium-containing compound, for example, a complex oxide containing lithium and a transition metal element, a phosphate compound containing lithium and a transition metal element and the like are cited. Specially, a compound containing at least one selected from the group consisting of cobalt, nickel, manganese, and iron as a transition metal element is preferable, since thereby a higher voltage is able to be obtained. The chemical formula thereof is expressed by, for example, $Li_xM1O_2$ or $Li_yM2PO_4$. In the formula, M1 and M2 represent one or more transition metal elements. Values of x and y vary according to the charge and discharge state, and are generally in the range of $0.05 \leq x \leq 1.10$ and $0.05 \leq y \leq 1.10$.

As the complex oxide containing lithium and a transition metal element, for example, a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (z<1)), a lithium nickel cobalt manganese complex oxide ($Li_xNi_{(1-v-w)}Co_vMn_wO_2$ (v+w<1)), lithium manganese complex oxide having a spinel structure ($LiMn_2O_4$) and the like are cited. Specially, a complex oxide containing cobalt is preferable, since thereby a high capacity is obtained and superior cycle characteristics are obtained. Further, as the phosphate compound containing lithium and a transition metal element, for example, lithium iron phosphate compound ($LiFePO_4$) or a lithium iron manganese phosphate compound ($LiFe_{1-u}Mn_uPO_4$ (u<1)) and the like are cited.

In addition, as the cathode material capable of inserting and extracting lithium, for example, an oxide such as titanium oxide, vanadium oxide, and manganese dioxide; a disulfide such as titanium disulfide and molybdenum sulfide; a chalcogenide such as niobium selenide; sulfur; a conductive polymer such as polyaniline and polythiophene are cited.

It is needless to say that the cathode material capable of inserting and extracting lithium may be a material other than the foregoing compounds. Further, the two or more of the foregoing series of cathode materials may be used by mixture voluntarily.

As the cathode binder, for example, a synthetic rubber such as styrene-butadiene rubber, fluorinated rubber, and ethylene propylene diene; or a polymer material such as polyvinylidene fluoride are cited. One thereof may be used singly, or a plurality thereof may be used by mixture.

As the cathode electrical conductor, for example, a carbon material such as graphite, carbon black, acetylene black, and Ketjen black is cited. Such a carbon material may be used singly, or a plurality thereof may be used by mixture. The cathode electrical conductor may be a metal material, a conductive polymer molecule or the like as long as the material has the electric conductivity.

The anode 22 has a structure in which, for example, an anode active material layer 22B is provided on the both faces of an anode current collector 22A having a pair of opposed faces. However, the anode active material layer 22B may be provided on only a single face of the anode current collector 22A.

The anode current collector 22A is made of, for example, a metal material such as copper, nickel, and stainless. The surface of the anode current collector 22A is preferably roughened. Thereby, due to so-called anchor effect, contact characteristics between the anode current collector 22A and the anode active material layer 22B are improved. In this case, it is enough that in at least a region of the surface of the anode current collector 22A that is opposed to the anode active material layer 22B is roughened. As a roughening method, for example, a method of forming fine particles by electrolytic treatment and the like are cited. The electrolytic treatment is a method for providing unevenness by forming the fine particles on the surface of the anode current collector 22A by electrolytic method in an electrolytic bath. A copper foil formed by using the electrolytic method is generally called "electrolytic copper foil."

The anode active material layer 22B contains, as an anode active material, one or more anode materials capable of inserting and extracting lithium. If necessary, the anode active material layer 22B may contain other material such as an anode binder and an anode electrical conductor. Then, the capacity chargeable in the anode material capable of inserting and extracting lithium is preferably larger than the discharge capacity of the cathode 21. Details of the anode binder and the anode electrical conductor are, for example, similar to those of the cathode binder and the cathode electrical conductor, respectively.

As the anode material capable of inserting and extracting lithium, a material that is capable of inserting and extracting lithium and has at least one of metal elements and metalloid elements as an element is cited, since a high energy density is thereby obtained. Such an anode material may be a simple substance, an alloy, or a compound of a metal element or a metalloid element, or may have one or more phases thereof at least in part. In the invention, "alloys" include an alloy containing one or more metal elements and one or more metalloid elements, in addition to an alloy composed of two or more metal elements. Further, "alloy" in the invention may contain a nonmetallic element. The structure thereof includes a solid solution, a eutectic crystal (eutectic mixture), an intermetallic compound, and a structure in which two or more thereof coexist.

As the foregoing metal element or the foregoing metalloid element, a metal element or a metalloid element capable of forming an alloy with lithium is cited. Specifically, magnesium, boron (B), aluminum, gallium (Ga), indium (In), silicon, germanium (Ge), tin, lead (Pb), bismuth (Bi), cadmium (Cd), silver (Ag), zinc, hafnium (Hf), zirconium (Zr), yttrium (Y), palladium (Pd), platinum (Pt) and the like are cited. Specially, at least one of silicon and tin is preferable, and silicon is more preferable. Silicon has the high ability to insert and extract lithium, and provides a high energy density.

As a material containing at least one of silicon and tin, for example, the simple substance, an alloy, or a compound of silicon; the simple substance, an alloy, or a compound of tin; and a material having one or more phases thereof at least in part are cited.

As the alloy of silicon, for example, an alloy containing at least one selected from the group consisting of tin, nickel, copper, iron, cobalt, manganese, zinc, indium, silver, titanium, germanium, bismuth, antimony (Sb), and chromium as the second element other than silicon is cited. As the compound of silicon, for example, a compound containing oxygen or carbon (C) is cited, and may contain the foregoing second element in addition to silicon. Examples of the alloy or the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v (0<v\leq 2)$, $SnO_w (0<w\leq 2)$, $LiSiO$ and the like.

As the alloy of tin, for example, an alloy containing at least one selected from the group consisting of silicon, nickel, copper, iron, cobalt, manganese, zinc, indium, silver, titanium, germanium, bismuth, antimony, and chromium as the second element other than tin is cited. As a compound of tin, for example, a compound containing oxygen or carbon is cited, and may contain the foregoing second element in addition to tin. Examples of the alloy or the compound of tin include $SnSiO_3$, $LiSnO$, $Mg_2Sn$ and the like.

In particular, as the material containing at least one of silicon and tin, for example, a material containing a second element and a third element in addition to tin as a first element is preferable. The second element is at least one selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth, and silicon. The third element is at least one selected from the group consisting of boron, carbon, aluminum, and phosphorus (P). In the case where the second element and the third element are contained, the cycle characteristics are improved.

Specially, a SnCoC-containing material that contains tin, cobalt, and carbon as an element, in which the carbon content is in the range from 9.9 wt % to 29.7 wt %, and the cobalt ratio in relation to the total of tin and cobalt (Co/(Sn+Co)) is in the range from 30 wt % to 70 wt % is preferable. In such a composition range, a high energy density is able to be obtained.

The SnCoC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effect is obtained.

The SnCoC-containing material has a phase containing tin, cobalt, and carbon. Such a phase is preferably a low crystalline phase or an amorphous phase. The phase is a reaction phase capable of being reacted with lithium, and superior cycle characteristics are thereby obtained. The half bandwidth of the diffraction peak obtained by X-ray diffraction of the phase is preferably 1.0 deg or more based on diffraction angle of 2θ in the case where CuKα ray is used as a specific X ray, and the insertion rate is 1 deg/min. Thereby, lithium is more smoothly inserted and extracted, and reactivity with the electrolyte is decreased.

It is easily determined whether or not the diffraction peak obtained by X-ray diffraction of the phase corresponds to the reaction phase capable of being reacted with lithium, by comparing an X-ray diffraction chart before the electrochemical reaction with lithium to an X-ray diffraction chart after the electrochemical reaction with lithium. For example, if the diffraction peak position in the X-ray diffraction chart after the electrochemical reaction with lithium is changed from the diffraction peak position in the X-ray diffraction chart before the electrochemical reaction with lithium, the diffraction peak obtained by X-ray diffraction of the phase corresponds to the reaction phase capable of being reacted with lithium. In this case, for example, the diffraction peak of the low crystalline or amorphous reaction phase is shown in the range from $2\theta=20$ deg to 50 deg. The low crystalline or amorphous reaction phase contains, for example, the foregoing respective elements. It is considered that the low crystalline or amorphous reaction phase is mainly realized by carbon.

The SnCoC-containing material may have a phase containing a simple substance of each element or part thereof, in addition to the low crystalline or the amorphous phase.

In particular, in the SnCoC-containing material, at least part of carbon as an element is preferably bonded with a metal element or a metalloid element as other element. Cohesion or crystallization of tin or the like is thereby inhibited.

As a measurement method for examining bonding state of elements, for example, X-ray Photoelectron Spectroscopy (XPS) is cited. XPS is a method for examining element composition and element bonding state in the region up to several nm from the sample surface by irradiating the sample surface with soft X ray (in a commercial device, Al—K$\alpha$ ray or Mg—K$\alpha$ ray is used) and measuring motion energy of a photoelectron jumping out from the sample surface.

The bound energy of an inner orbit electron of an element is changed correlatively to the charge density on the element in an initial approximate manner. For example, in the case where the charge density of carbon element is decreased by interaction with an element existing in the vicinity thereof, an outer orbit electron such as 2p electron is decreased, and thus 1s electron of carbon element is subject to strong binding force by the orbit. That is, in the case where the charge density of the element is decreased, the bound energy becomes high. In XPS, in the case where the bound energy becomes high, the peak is shifted to a higher energy region.

In XPS, in the case of graphite, the peak of 1s orbit of carbon (C1s) is shown in 284.5 eV in the apparatus in which energy calibration is made so that the peak of 4f orbit of gold atom (Au4f) is obtained in 84.0 eV. In the case of surface contamination carbon, the peak is shown in 284.8 eV. Meanwhile, in the case of higher charge density of carbon element, for example, in the case where carbon is bonded with an element that is more positive than carbon, the peak of C1s is shown in the region lower than 284.5 eV. That is, in the case where at least part of carbon contained in the SnCoC-containing material is bonded with the metal element, the metalloid element or the like as other element, the peak of the composite wave of C1s obtained for the SnCoC-containing material is shown in the region lower than 284.5 eV.

In performing XPS measurement, in the case where the surface is covered with surface contamination carbon, the surface is preferably slightly sputtered by an argon ion gun attached to an XPS device. Further, if the SnCoC-containing material as a measuring target exists in the anode 22, it is preferable that after the secondary battery is disassembled and the anode 22 is taken out, the anode 22 is preferably washed with a volatile solvent such as dimethyl carbonate in order to remove a low volatile solvent and an electrolyte salt existing on the surface of the anode 22. Such sampling is desirably performed under the inactive atmosphere.

Further, in XPS measurement, for example, the peak of C1s is used for calibrating the energy axis of spectrums. Since surface contamination carbon generally exists on a material surface, the peak of C1s of the surface contamination carbon is set to in 284.8 eV, which is used as an energy reference value. In XPS measurement, the waveform of the peak of C1s is obtained as a form including the peak of the surface contamination carbon and the peak of carbon in the SnCoC-containing material. Therefore, for example, by performing analysis by using commercially available software, the peak of the surface contamination carbon and the peak of carbon in the SnCoC-containing material are separated. In the analysis of the waveform, the position of the main peak existing on the lowest bound energy side is set to the energy reference value (284.8 eV).

The SnCoC-containing material is able to be formed by, for example, mixing raw materials of respective elements, dissolving the resultant mixture in an electric furnace, a high frequency induction furnace, an arc melting furnace or the like and then solidifying the resultant. Otherwise, the SnCoC-containing material may be formed by various atomization methods such as gas atomizing and water atomizing; various roll methods; or a method using mechanochemical reaction such as mechanical alloying method and mechanical milling method. Specially, the method using mechanochemical reaction is preferable, since thereby the SnCoC-containing material becomes the low crystalline structure or the amorphous structure. In the method using the mechanochemical reaction, for example, a manufacturing apparatus such as a planetary ball mill apparatus and an attliter is able to be used.

As the raw material, a mixture of simple substances of the respective elements may be used, but an alloy is preferably used for part of elements other then carbon. In the case where carbon is added to the alloy and thereby the material is synthesized by the method using mechanical alloying method, the low crystalline structure or the amorphous structure is obtained and reaction time is shortened as well. The state of the raw material may be powder or a mass.

In addition to the SnCoC-containing material, an SnCoFeC-containing material having tin, cobalt, iron, and carbon as an element is also preferable. The composition of the SnCoFeC-containing material is able to be voluntarily set. For example, as a composition in which the iron content is set small, it is preferable that the carbon content is in the range from 9.9 wt % to 29.7 wt %, the iron content is in the range from 0.3 wt % to 5.9 wt %, and the cobalt ratio in relation to the total of tin and cobalt (Co/(Sn+Co)) is in the range from 30 wt % to 70 wt %. Further, for example, as a composition in which the iron content is set large, it is preferable that the carbon content is in the range from 11.9 wt % to 29.7 wt %, the ratio of the total of cobalt and iron in relation to the total of tin, cobalt, and iron ((Co+Fe)/(Sn+Co+Fe)) is in the range from 26.4 wt % to 48.5 wt %, and the cobalt ratio in relation to the total of cobalt and iron (Co/(Co+Fe)) is in the range from 9.9 wt % to 79.5 wt %. In such a composition range, a high energy density is obtained. The crystallinity of the SnCoFeC-containing material, the measurement method for examining bonding state of elements, the forming method of the SnCoFeC-containing material and the like are similar to those of the foregoing SnCoC-containing material.

The anode active material layer 22B using the simple substance, an alloy, or a compound of silicon; the simple substance, an alloy, or a compound of tin; or a material having one or more phases thereof at least in part as the anode material capable of inserting and extracting lithium is, for example, formed by using vapor-phase deposition method, liquid-phase deposition method, spraying method, coating method, firing method, or a combination of two or more of these methods. In this case, the anode current collector 22A and the anode active material layer 22B are preferably alloyed in at least part of the interface thereof. More specifically, at the interface thereof, the element of the anode current collector 22A may be diffused in the anode active material layer 22B; or the element of the anode active material layer 22B may be diffused in the anode current collector 22A; or these elements may be diffused in each other. Thereby, destruction due to expansion and shrinkage of the anode active material layer 22B in charge and discharge is inhibited, and the electron conductivity between the anode current collector 22A and the anode active material layer 22B is improved.

As vapor-phase deposition method, for example, physical deposition method or chemical deposition method are cited. Specifically, vacuum evaporation method, sputtering method, ion plating method, laser ablation method, thermal Chemical Vapor Deposition (CVD) method, plasma CVD method and the like are cited. As liquid-phase deposition method, a known technique such as electrolytic plating and electroless plating is able to be used. Coating method is a method in which, for example, after a particulate anode active material is mixed with a binder and the like, the resultant mixture is dispersed in a solvent and then coating is provided. Firing method is, for example, a method in which after coating is provided by coating method, heat treatment is provided at temperature higher than the melting point of the binder or the like. For firing method, a known technique such as atmosphere firing method, reactive firing method, and hot press firing method is cited as well.

In addition to the foregoing, as the anode material capable of inserting and extracting lithium, for example, a carbon material is cited. As the carbon material, for example, graphitizable carbon, non-graphitizable carbon in which the spacing of (002) plane is 0.37 nm or more, or graphite in which the spacing of (002) plane is 0.34 nm or less and the like are cited. More specifically, pyrolytic carbon, coke, glassy carbon fiber, an organic polymer compound fired body, activated carbon, carbon black and the like are cited. Of the foregoing, the coke includes pitch coke, needle coke, petroleum coke and the like. The organic polymer compound fired body is obtained by firing and carbonizing a phenol resin, a furan resin or the like at appropriate temperature. In the carbon material, the crystal structure change associated with inserting and extracting lithium is very little. Therefore, a high energy density is thereby obtained and superior cycle characteristics are thereby obtained. In addition, the carbon material also functions as an electrical conductor, and thus the carbon material is preferably used. The shape of the carbon material may be any of a fibrous shape, a spherical shape, a granular shape, and a scale-like shape.

As the anode material capable of inserting and extracting lithium, for example, a metal oxide, a polymer compound and the like capable of inserting and extracting lithium are cited. As the metal oxide, for example, iron oxide, ruthenium oxide, molybdenum oxide and the like are cited. As the polymer compound, for example, polyacetylene, polyaniline, polypyrrole and the like are cited.

It is needless to say that the anode material capable of inserting and extracting lithium may be a material other than the foregoing materials. Further, the two or more of the foregoing series of anode materials may be used by mixture voluntarily.

The foregoing anode active material is in a state of a plurality of particles. That is, the anode active material layer 22B has an anode active material in a state of a plurality of particles (hereinafter simply referred to as "anode active material particles"). The anode active material particles are formed by, for example, the foregoing vapor-phase deposition method or the like. However, the anode active material particles may be formed by a method other than vapor-phase deposition method.

In the case where the anode active material particles are formed by deposition method such as vapor-phase deposition method, the anode active material particles may have a single layer structure formed by a single deposition step or may have a multilayer structure formed by a plurality of deposition steps. However, if the anode active material particles are formed by evaporation method associated with high heat in deposition, the anode active material particles preferably have a multilayer structure. In the case where the deposition step of the anode material is divided into several steps (a plurality of thin layers of the anode material are sequentially formed and deposited), time that the anode current collector 22A is exposed at high heat is shortened compared to a case that the deposition is performed in a single deposition step, accordingly the anode current collector 22A is hardly subject to thermal damage.

The anode active material particles are grown, for example, in the thickness direction of the anode active material layer 22B from the surface of the anode current collector 22A. The anode active material particles are preferably linked to the anode current collector 22A at the root thereof, since thereby expansion and shrinkage of the anode active material layer 22B are inhibited in charge and discharge. In this case, it is preferable that the anode active material particles are formed by vapor-phase deposition method or the like, and as described above, at least part of the interface with the anode current collector 22A is alloyed. More specifically, at the interface in between, the element of the anode current collector 22A may be diffused in the anode active material particles; or the element of the anode active material particles may be diffused in the anode current collector 22A; or these elements may be diffused in each other.

In particular, the anode active material layer 22B preferably has an oxide-containing film that covers the surface of the anode active material particles (the region of the anode active material particles that would be contacted with an electrolytic solution if the oxide-containing film was not provided) according to needs. In this case, the oxide-containing film functions as a protective film in relation to the electrolytic solution, and decomposition reaction of the electrolytic solution is inhibited in charge and discharge, and thereby the cycle characteristics and the storage characteristics are improved. The oxide-containing film may cover the entire surface of the anode active material particles, or may cover only part of the surface of the anode active material particles. Specially, the oxide-containing film preferably covers the entire surface of the anode active material particles, since decomposition reaction of the electrolytic solution is effectively inhibited.

The oxide-containing film contains, for example, an oxide of at least one selected from the group consisting of silicon, germanium, and tin. Specially, the oxide-containing film preferably contains an oxide of silicon. Thereby, the oxide-containing film easily covers over the entire surface of the anode active material particles, and is able to provide superior protective action. It is needless to say that the oxide-containing film may contain an oxide other than the foregoing oxide.

The oxide-containing film is formed by, for example, vapor-phase deposition method or liquid-phase deposition method. Specially, the oxide-containing film is preferably formed by liquid-phase deposition method, since thereby the oxide-containing film easily covers a wide range of the surface of the anode active material particles. As the liquid-phase deposition method, liquid-phase precipitation method, solgel method, coating method, dip coating method and the like are cited. Specially, liquid-phase precipitation method, solgel method, or dip coating method is preferable, and liquid-phase precipitation method is more preferable, since thereby higher effects are obtained. The oxide-containing film may be formed by a single forming method out of the foregoing series of forming methods, or may be formed by two or more forming methods thereof.

Further, the anode active material layer 22B preferably has a metal material not being alloyed with lithium in a gap in the anode active material layer 22B, that is, in a gap between the anode active material particles or in a gap in the anode active material particles described later according to needs. In this case, the plurality of anode active material particles are bound to each other with the metal material in between. In addition, in the case where the metal material exists in the foregoing gap, expansion and shrinkage of the anode active material layer 22B are inhibited. Accordingly, the cycle characteristics and the storage characteristics are improved.

The metal material has, for example, a metal element not being alloyed with lithium as an element. As the metal element, for example, at least one selected from the group consisting of iron, cobalt, nickel, zinc, and copper is cited. Specially, cobalt is preferable, since thereby the metal material easily intrudes into the foregoing gap, and superior binding action is obtained. It is needless to say that the metal material may have a metal element other than the foregoing metal elements. However, "metal material" herein is a comprehensive term, including not only a simple substance but also an alloy and a metal compound.

The metal material is formed by, for example, vapor-phase deposition method or liquid-phase deposition method. Specially, the metal material is preferably formed by the liquid-phase deposition method, since thereby the metal material easily intrudes into a gap in the anode active material layer 22B. As the liquid-phase deposition method, for example, electrolytic plating method, non-electrolytic plating method or the like is cited. Specially, electrolytic plating method is preferable, since thereby the metal material easily intrudes into the foregoing gap, and the formation time thereof is shortened. The metal material may be formed by a single forming method out of the foregoing series of forming methods, or may be formed by two or more forming methods thereof.

The anode active material layer 22B may have one of the oxide-containing film and the metal material described above, or may have both thereof. However, to more improve the cycle characteristics and the storage characteristics, the anode active material layer 22B preferably contains both thereof. Further, in the case where the anode active material layer 22B contains only one of the oxide-containing film and the metal material, to more improve the cycle characteristics and the storage characteristics, the anode active material layer 22B preferably has the oxide-containing film. In the case where the anode active material layer 22B contains both the oxide-containing film and the metal material, either may be formed first. However, to more improve the cycle characteristics and the storage characteristics, the oxide-containing film is preferably formed first.

A description will be given in detail of the anode 22 with reference to FIG. 3 to FIG. 6B.

Figure 3:
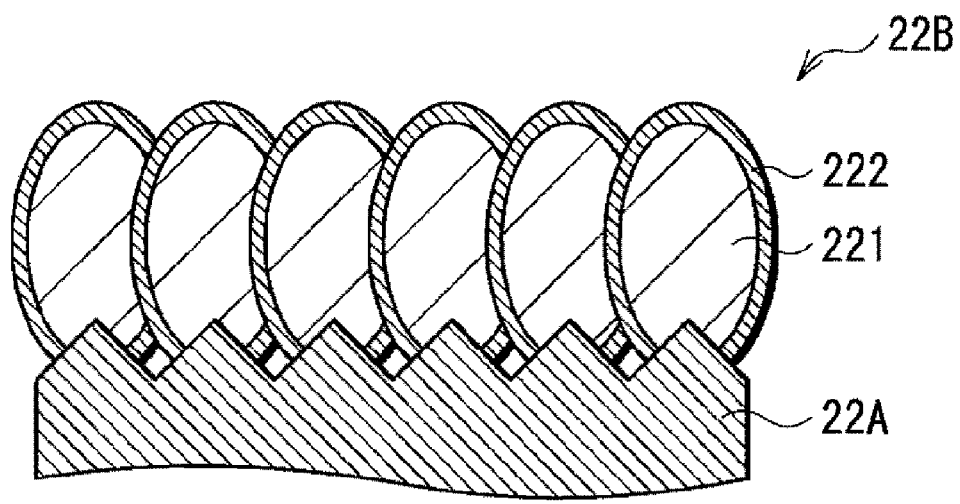
FIG. 3 is a cross sectional view showing an enlarged structure of the anode shown in FIG. 2.
Figure 4:
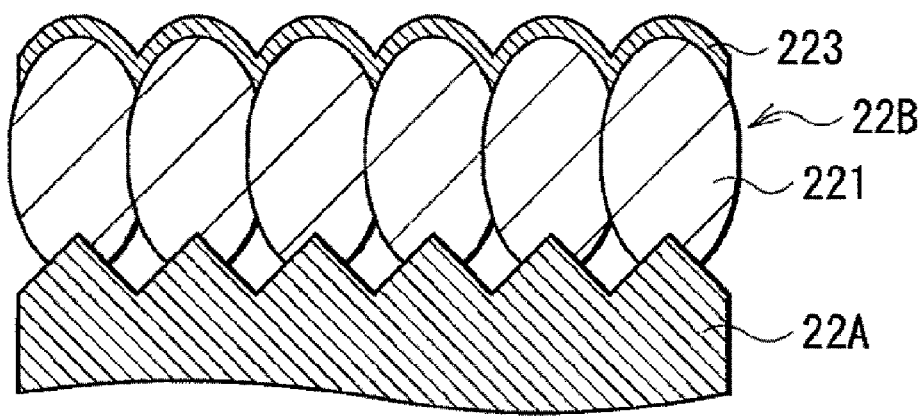
FIG. 4 is a cross sectional view showing a structure of an anode of a reference example.

First, a description will be given of a case that the anode active material layer 22B has the oxide-containing film together with the plurality of anode active material particles. FIG. 3 schematically shows a cross sectional structure of the anode 22 of the invention. FIG. 4 schematically shows a cross sectional structure of an anode of a reference example. FIG. 3 and FIG. 4 show a case that the anode active material particles have a single layer structure.

In the anode of an embodiment of the invention, as shown in FIG. 3, for example, when the anode material is deposited on the anode current collector 22A by vapor-phase deposition method such as evaporation method, a plurality of anode active material particles 221 are formed on the anode current collector 22A. In this case, in the case where the surface of the anode current collector 22A is roughened and a plurality of projection sections (for example, fine particles formed by electrolytic treatment) exist on the surface thereof, the anode active material particles 221 are grown for every projection section described above in the thickness direction. Thus, the plurality of anode active material particles 221 are arranged on the anode current collector 22A, and are linked to the surface of the anode current collector 22A at the root thereof. After that, for example, in the case where an oxide-containing film 222 is formed on the surface of the anode active material particle 221 by liquid-phase deposition method such as liquid-phase precipitation method, the oxide-containing film 222 covers almost entire surface of the anode active material particle 221, in particular, covers a wide range from the apex section to the root of the anode active material particle 221. Such a covering state in the wide range with the oxide-containing film 222 is a characteristic obtained in the case where the oxide-containing film 222 is formed by liquid-phase deposition method. That is, in the case where the oxide-containing film 222 is formed by liquid-phase deposition method, such covering action is applied not only to the apex section of the anode active material particle 221 but also to the root thereof. Accordingly, the anode active material particle 221 is covered with the oxide-containing film 222 down to the root thereof.

Meanwhile, in the anode of the reference example, as shown in FIG. 4, for example, in the case where the plurality of anode active material particles 221 are formed by vapor-phase deposition method and then an oxide-containing film 223 is formed by vapor-phase deposition method similarly, the oxide-containing film 223 covers only the apex section of the anode active material particle 221. Such a small range covered with the oxide-containing film 223 is a characteristic obtained in the case where the oxide-containing film 223 is formed by vapor-phase deposition method. That is, in the case where the oxide-containing film 223 is formed by vapor-phase deposition method, such covering action is applied to the apex section of the anode active material particle 221 but not applied to the root thereof. Accordingly, the anode active material particle 221 is not covered with the oxide-containing film 223 down to the root thereof.

In FIG. 3, the description has been given of a case that the anode active material layer 22B is formed by vapor-phase deposition method. However, in the case where the anode active material layer 22B is formed by other forming method such as coating method and sintering method, an oxide-containing film is similarly formed to cover almost entire surface of the plurality of anode active material particles.

Figure 5A:
FIGS. 5A and 5B are an SEM photograph showing a cross sectional structure of the anode shown in FIG. 2 and a schematic view thereof.
Figure 5B:
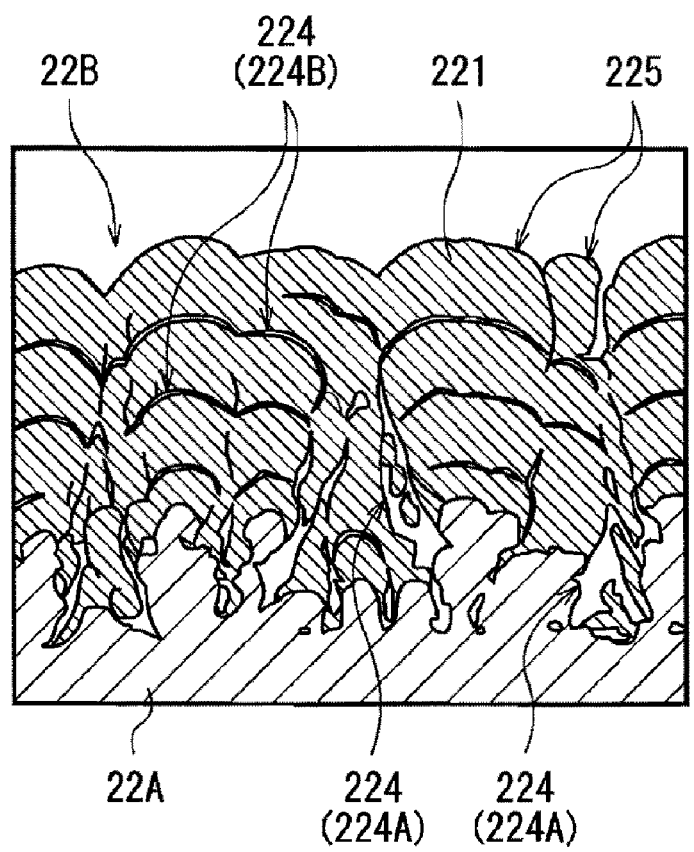

Next, a description will be given of a case that the anode active material layer 22B has the metal material not being alloyed with lithium together with the plurality of anode active material particles. FIGS. 5A and 5B show an enlarged cross sectional structure of the anode 22. FIG. 5A is a Scanning Electron Microscope (SEM) photograph (secondary electron image), and FIG. 5B is a schematic drawing of the SEM image shown in FIG. 5A. FIGS. 5A and 5B show a case that the plurality of anode active material particles 221 have a multilayer structure in the particles.

In the case where the anode active material particles 221 have the multilayer structure, a plurality of gaps 224 are generated in the anode active material layer 22B due to the arrangement structure, the multilayer structure, and the surface structure of the plurality of anode active material particles 221. The gap 224 mainly includes two types of gaps 224A and 224B categorized according to the cause of generation. The gap 224A is a gap generated between adjacent anode active material particles 221. Meanwhile, the gap 224B is a gap generated between each layer in the anode active material particles 221.

On the exposed face (outermost surface) of the anode active material particle 221, a void 225 may be generated. As a fibrous minute projection section (not shown) is generated on the surface of the anode active material particles 221, the void 225 is generated between the projection sections. The void 225 may be generated entirely over the exposed face of the anode active material particles 221, or may be generated in only part thereof. Since the foregoing fibrous minute projection section is generated on the surface of the anode active material particles 221 every time the anode active material particles 221 are formed, the void 225 may be generated between each layer in addition to on the exposed face of the anode active material particles 221.

Figure 6A:
FIGS. 6A and 6B are an SEM photograph showing another cross sectional structure of the anode shown in FIG. 2 and a schematic view thereof.
Figure 6B:
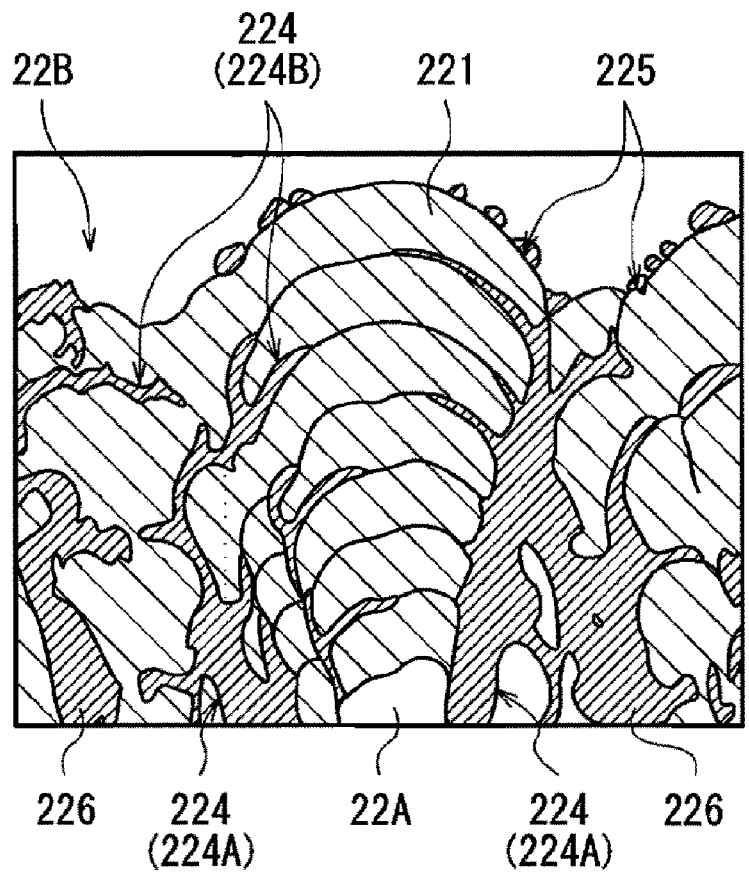

FIGS. 6A and 6B show another cross sectional structure of the anode 22, and correspond to FIGS. 5A and 5B. The anode active material layer 22B has a metal material 226 not being alloyed with lithium in the gaps 224A and 224B. In this case, only one of the gaps 224A and 224B may have the metal material 226, but the both gaps 224A and 224B preferably have the metal material 226, since thereby higher effect is obtained.

The metal material 226 intrudes into the gap 224A between adjacent anode active material particles 221. More specifically, in the case where the anode active material particles 221 are formed by vapor-phase deposition method or the like, the anode active material particles 221 are grown for every projection section existing on the surface of the anode current collector 22A as described above, and thus the gap 224A is generated between the adjacent anode active material particles 221. The gap 224A causes lowering of the binding characteristics of the anode active material layer 22B. Therefore, to improve the binding characteristics, the metal material 226 fills in the foregoing gap 224A. In this case, it is enough that part of the gap 224A is filled therewith, but the larger filling amount is preferable, since thereby the binding characteristics of the anode active material layer 22B are more improved. The filling amount of the metal material 226 is preferably 20% or more, more preferably 40% or more, and much more preferably 80% or more.

Further, the metal material 226 intrudes into the gap 224B in the anode active material particles 221. More specifically, in the case where the anode active material particles 221 have a multilayer structure, the gap 224B is generated between each layer. The gap 224B causes lowering of the binding characteristics of the anode active material layer 22B as the foregoing gap 224A does. Therefore, to improve the binding characteristics, the metal material 226 fills in the foregoing gap 224B. In this case, it is enough that part of the gap 224B is filled therewith, but the larger filling amount is preferable, since thereby the binding characteristics of the anode active material layer 22B are more improved.

To prevent the fibrous minute projection section (not shown) generated on the exposed face of the uppermost layer of the anode active material particles 221 from adversely affecting the performance of the secondary battery, the anode active material layer 22B may have the metal material 226 in the void 225. More specifically, in the case where the anode active material particles 221 are formed by vapor-phase deposition method or the like, the fibrous minute projection sections are generated on the surface thereof, and thus the void 225 is generated between the projection sections. The void 225 causes increase of the surface area of the anode active material particles 221, and accordingly the amount of an irreversible coat formed on the surface is also increased, possibly resulting in lowering of progression of the electrode reaction (charge and discharge reaction). Therefore, to avoid the lowering of progression of the electrode reaction, the foregoing void 225 is filled with the metal material 226. In this case, it is enough at minimum that part of the void 225 is filled therewith, but the larger filling amount is preferable, since thereby the lowering of progression of the electrode reaction is more inhibited. In FIGS. 6A and 6B, the metal material 226 is dotted on the surface of the uppermost layer of the anode active material particles 221, which means that the foregoing minute projection section exists in the location where the metal material 226 is dotted. It is needless to say that the metal material 226 is not necessarily dotted on the surface of the anode active material particles 221, but may cover the entire surface thereof.

In particular, the metal material 226 that intrudes into the gap 224B has a function to fill in the void 225 in each layer. More specifically, in the case where the anode material is deposited several times, the foregoing minute projection section is generated on the surface of the anode active material particle 221 for every deposition. Therefore, the metal material 226 fills in not only the gap 224B in each layer, but also the void 225 in each layer.

In FIGS. 5A and 5B and 6A and 6B, the description has been given of a case that the anode active material particles 221 have the multilayer structure, and both the gaps 224A and 224B exist in the anode active material layer 22B. Thus, in this case, the anode active material layer 22B has the metal material 226 in the gaps 224A and 224B. Meanwhile, in the case where the anode active material particles 221 have a single layer structure, and only the gap 224A exists in the anode active material layer 22B, the anode active material layer 22B has the metal material 226 only in the gap 224A. It is needless to say that the void 225 is generated in the both cases, and thus in any case, the metal material 226 is included in the void 225.

The foregoing electrolytic solution is impregnated in the separator 23. The separator 23 separates the cathode 21 from the anode 22, and passes lithium ions while preventing current short circuit due to contact of the both electrodes. The separator 23 is made of, for example, a porous film made of a synthetic resin such as polytetrafluoroethylene, polypropylene, and polyethylene, a ceramics porous film or the like. The separator 23 may have a structure in which two or more porous films as the foregoing porous films are layered.

The secondary battery is manufactured, for example, by the following procedure.

First, the cathode 21 is formed. First, a cathode active material, a cathode binder, and a cathode electrical conductor are mixed to prepare a cathode mixture, which is dispersed in an organic solvent to form a paste cathode mixture slurry. Subsequently, the both faces of the cathode current collector 21A are uniformly coated with the cathode mixture slurry by a doctor blade, a bar coater or the like, which is dried. Finally, the coating is compression-molded by a rolling press machine or the like while being heated if necessary to form the cathode active material layer 21B. In this case, the coating may be compression-molded over several times.

Next, the anode 22 is formed. First, the anode current collector 22A made of an electrolytic copper foil or the like is prepared. After that, the anode material is deposited on the both faces of the anode current collector 22A by vapor-phase deposition method such as evaporation method to form the plurality of anode active material particles. After that, the oxide-containing film is formed by liquid-phase deposition method such as liquid-phase precipitation method, or the metal material is formed by liquid-phase deposition method such as electrolytic plating method, or the both thereof are formed, and thereby the anode active material layer 22B is formed.

The secondary battery is assembled as follows. First, the cathode lead 25 is attached to the cathode current collector 21A by welding or the like, and the anode lead 26 is attached to the anode current collector 22A by welding or the like. Subsequently, the cathode 21 and the anode 22 are layered and spirally wound with the separator 23 in between to form the spirally wound electrode body 20. After that, the center pin 24 is inserted in the center of the spirally wound electrode body 20. Subsequently, while the spirally wound electrode body 20 is sandwiched between the pair of insulating plates 12 and 13, the spirally wound electrode body 20 is contained in the battery can 11, an end of the cathode lead 25 is welded to the safety valve mechanism 15, and an end of the anode lead 26 is welded to the battery can 11. Subsequently, the foregoing electrolytic solution is injected into the battery can 11, and impregnated in the separator 23. Finally, the battery cover 14, the safety valve mechanism 15, and the PTC device 16 are fixed at the open end section of the battery can 11 by being caulked with the gasket 17. Accordingly, the secondary battery shown in FIG. 1 and FIG. 2 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the cylindrical secondary battery, in the case where the capacity of the anode 22 is expressed based on inserting and extracting lithium, the decomposition reaction of the electrolytic solution is inhibited in charge and discharge since the foregoing electrolytic solution is included. Therefore, the cycle characteristics and the storage characteristics are able to be improved.

In particular, since the cycle characteristics and the storage characteristics are improved in the case where the anode 22 contains silicon or the like advantageous to realizing a high capacity (material that is capable of inserting and extracting lithium and that has at least one of metal elements and metalloid elements), higher effect is able to be obtained than in a case that the anode 22 contains other anode material such as a carbon material.

Second Secondary Battery

The second secondary battery has a structure, operations, and effects similar to those of the first secondary battery except that the anode 22 has a different structure, and is able to be manufactured by a procedure similar to that of the first secondary battery.

The anode 22 has a structure in which the anode active material layer 22B is provided on the both faces of the anode current collector 22A in the same manner as that of the first secondary battery. The anode active material layer 22B contains, for example, as an anode active material, a material having silicon or tin as an element. Specifically, for example, the anode active material layer 22B contains the simple substance, an alloy, or a compound of silicon, or the simple substance, an alloy, or a compound of tin. The anode active material layer 22B may contain two or more thereof.

The anode active material layer 22B is formed by using, for example, vapor-phase deposition method, liquid-phase deposition method, spraying method, firing method, or two or more of these methods. The anode active material layer 22B and the anode current collector 22A are preferably alloyed at the interface thereof at least in part. Specifically, it is preferable that at the interface thereof, the element of the anode current collector 22A is diffused in the anode active material layer 22B, or the element of the anode active material layer 22B is diffused in the anode current collector 22A, or both elements are diffused therein each other. Thereby, deconstruction due to expansion and shrinkage of the anode active material layer 22B in charge and discharge is inhibited, and electron conductivity between the anode active material layer 22B and the anode current collector 22A is improved.

As vapor-phase deposition method, for example, physical deposition method or chemical deposition method is cited. Specifically, vacuum evaporation method, sputtering method, ion plating method, laser ablation method, thermal CVD (Chemical Vapor Deposition) method, plasma CVD method and the like are cited. As liquid-phase deposition method, a known technique such as electrolytic plating and electroless plating is able to be used. Firing method is, for example, a method in which a particulate anode active material, a binder and the like are mixed and dispersed in a solvent, and then the anode current collector is coated with the mixture, and the resultant is heat-treated at temperatures higher than the melting point of the binder and the like. For firing method, a known technique such as atmosphere firing method, reactive firing method, and hot press firing method is cited.

Third Secondary Battery

The third secondary battery is a lithium metal secondary battery in which the capacity of the anode 22 is expressed based on precipitation and dissolution of lithium. The secondary battery has a structure similar to that of the first secondary battery, except that the anode active material layer 22B is made of lithium metal, and is manufactured in the same manner as that of the first secondary battery.

In the secondary battery, the lithium metal is used as an anode active material. Thereby, a high energy density is able to be obtained. The anode active material layer 22B may exist in assembling. Otherwise, it is possible that the anode active material layer 22B does not exist in assembling, and is made of the lithium metal precipitated in charging. Otherwise, by using the anode active material layer 22B as a current collector, the anode current collector 22A may be omitted.

In the secondary battery, when charged, for example, lithium ions are extracted from the cathode 21, and precipitated as the lithium metal on the surface of the anode current collector 22A through the electrolytic solution impregnated in the separator 23. Meanwhile, when discharged, for example, the lithium metal is eluded as lithium ions from the anode active material layer 22B, and the lithium ions are inserted in the cathode 21 through the electrolytic solution impregnated in the separator 23.

According to the cylindrical secondary battery, in the case where the capacity of the anode 22 is expressed based on precipitation and dissolution of lithium, the cycle characteristics and the storage characteristics are able to be improved since the secondary battery includes the foregoing electrolytic solution. Other effect of the secondary battery is similar to that of the foregoing first secondary battery.

Fourth Secondary Battery

Figure 7:
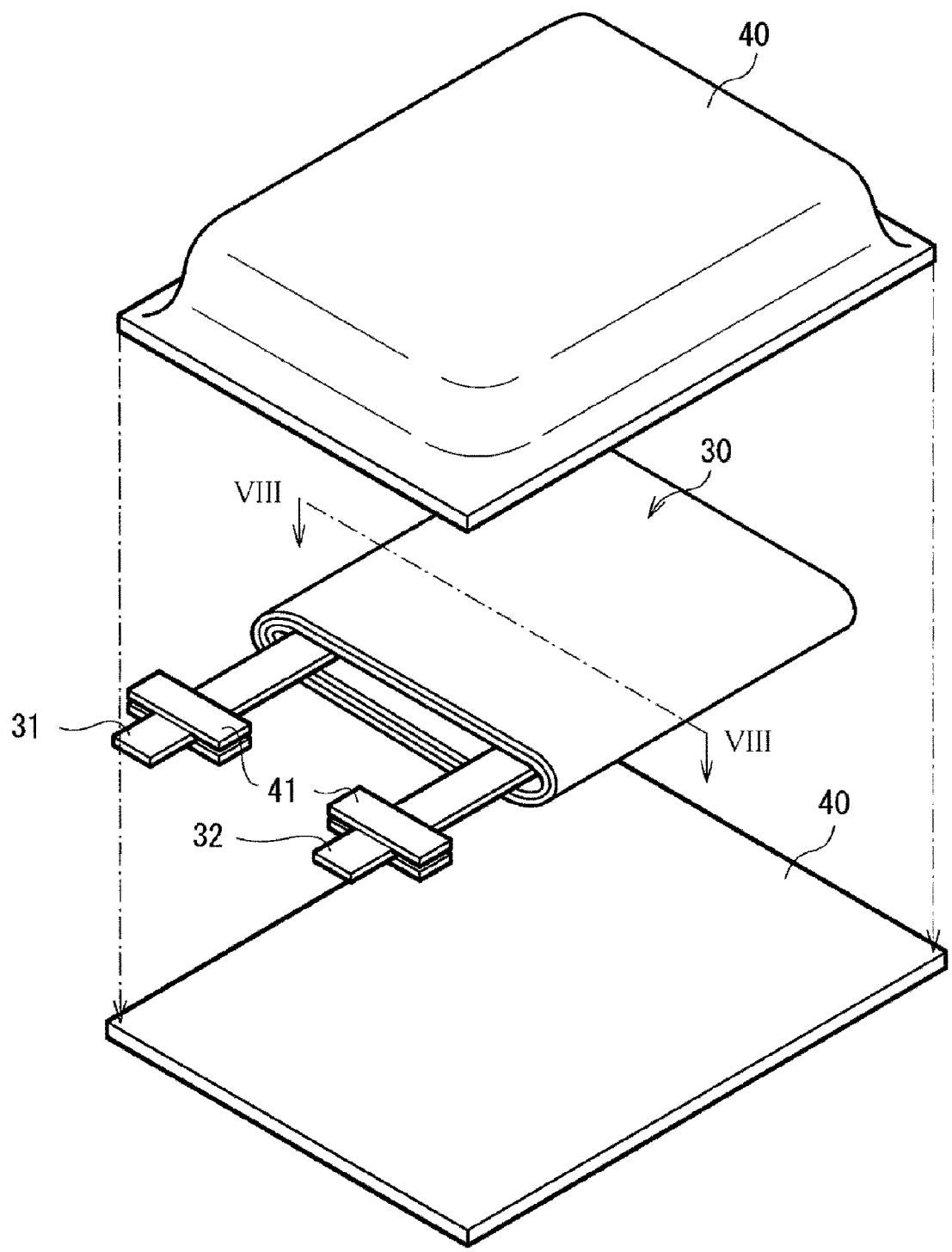
FIG. 7 is a cross sectional view showing a structure of a fourth secondary battery including the electrolytic solution according to the embodiment of the invention.
Figure 8:
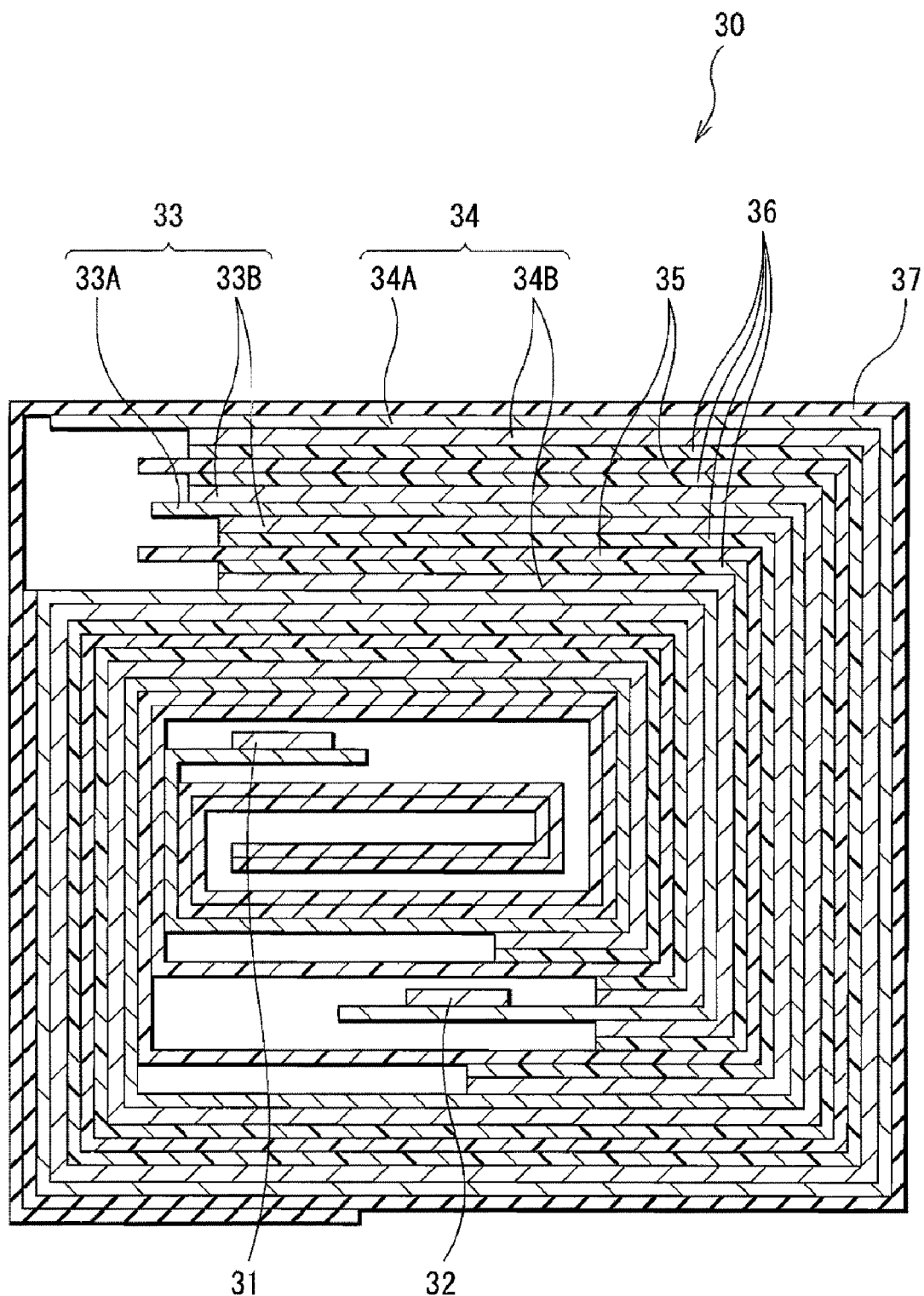
FIG. 8 is a cross sectional view taken along line VIII-VIII of the spirally wound electrode body shown in FIG. 7.

FIG. 7 shows an exploded perspective structure of a fourth secondary battery. FIG. 8 shows an enlarged cross section taken along line VIII-VIII of a spirally wound electrode body 30 shown in FIG. 7.

The secondary battery is, for example, a lithium ion secondary battery similar to the foregoing first secondary battery. In the secondary battery, the spirally wound electrode body 30 on which a cathode lead 31 and an anode lead 32 are attached is mainly contained in a film package member 40.

The battery structure using the film package member 40 is called laminated film structure.

The cathode lead 31 and the anode lead 32 are respectively directed from inside to outside of the package member 40 in the same direction, for example. The cathode lead 31 is made of, for example, a metal material such as aluminum, and the anode lead 32 is made of, for example, a metal material such as copper, nickel, and stainless. The metal materials are in the shape of a thin plate or mesh.

The package member 40 is made of an aluminum laminated film in which, for example, a nylon film, an aluminum foil, and a polyethylene film are bonded together in this order. The package member 40 has, for example, a structure in which the respective outer edges of 2 pieces of rectangle aluminum laminated films are bonded with each other by fusion bonding or an adhesive so that the polyethylene film and the spirally wound electrode body 30 are opposed to each other.

An adhesive film 41 to protect from outside air intrusion is inserted between the package member 40 and the cathode lead 31, the anode lead 32. The adhesive film 41 is made of a material having contact characteristics in relation to the cathode lead 31 and the anode lead 32. Examples of such a material include, for example, a polyolefin resin such as polyethylene, polypropylene, modified polyethylene, and modified polypropylene.

The package member 40 may be made of a laminated film having other lamination structure, a polymer film such as polypropylene, or a metal film, instead of the foregoing aluminum laminated film.

In the spirally wound electrode body 30, a cathode 33 and an anode 34 are layered with a separator 35 and an electrolyte 36 in between and then spirally wound. The outermost periphery thereof is protected by a protective tape 37.

The cathode 33 has a structure in which, for example, a cathode active material layer 33B is provided on the both faces of a cathode current collector 33A. The anode 34 has, for example, a structure in which an anode active material layer 34B is provided on the both faces of an anode current collector 34A. The anode 34 is arranged so that the anode active material layer 34B is opposed to the cathode active material layer 33B. The structures of the cathode current collector 33A, the cathode active material layer 33B, the anode current collector 34A, the anode active material layer 34B, and the separator 35 are respectively similar to those of the cathode current collector 21A, the cathode active material layer 21B, the anode current collector 22A, the anode active material layer 22B, and the separator 23 in the foregoing first secondary battery.

The electrolyte 36 is a so-called gelatinous electrolyte, containing the foregoing electrolytic solution and a polymer compound that holds the electrolytic solution. The gelatinous electrolyte is preferable, since thereby high ion conductivity (for example, 1 mS/cm or more at room temperature) is obtained and liquid leakage is prevented.

As the polymer compound, for example, polyacrylonitrile, polyvinylidene fluoride, a copolymer of polyvinylidene fluoride and polyhexafluoro propylene, polytetrafluoroethylene, polyhexafluoro propylene, polyethylene oxide, polypropylene oxide, polyphosphazene, polysiloxane, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate and the like are cited. One of these polymer compounds may be used singly, or a plurality thereof may be used by mixture. Specially, polyacrylonitrile, polyvinylidene fluoride, polyhexafluoro propylene, or polyethylene oxide is preferably used, since such a compound is electrochemically stable.

In the electrolyte 36 that is a gelatinous electrolyte, a solvent of the electrolytic solution means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the gelatinous electrolyte 36 in which the electrolytic solution is held by the polymer compound, the electrolytic solution may be directly used. In this case, the electrolytic solution is impregnated in the separator 35.

The secondary battery is manufactured, for example, by the following three manufacturing methods.

In the first manufacturing method, first, for example, the cathode 33 is formed by forming the cathode active material layer 33B on the both faces of the cathode current collector 33A, and the anode 34 is formed by forming the anode active material layer 34B on the both faces of the anode current collector 34A by a procedure similar to the procedure of forming the cathode 21 and the anode 22 in the foregoing first secondary battery. Subsequently, a precursor solution containing an electrolytic solution, a polymer compound, and a solvent is prepared. After the cathode 33 and the anode 34 are coated with the precursor solution, the solvent is volatilized to form the gelatinous electrolyte 36. Subsequently, the cathode lead 31 is attached to the cathode current collector 33A, and the anode lead 32 is attached to the anode current collector 34A. Subsequently, the cathode 33 and the anode 34 provided with the electrolyte 36 are layered with the separator 35 in between and spirally wound. After that, the protective tape 37 is adhered to the outermost periphery thereof to form the spirally wound electrode body 30. Finally, for example, after the spirally wound electrode body 30 is sandwiched between 2 pieces of the film package members 40, outer edges of the package members 40 are contacted by thermal fusion bonding or the like to enclose the spirally wound electrode body 30. Then, the adhesive films 41 are inserted between the cathode lead 31, the anode lead 32 and the package member 40. Thereby, the secondary battery shown in FIG. 7 and FIG. 8 is completed.

In the second manufacturing method, first, the cathode lead 31 is attached to the cathode 33, and the anode lead 32 is attached to the anode 34. After that, the cathode 33 and the anode 34 are layered with the separator 35 in between and spirally wound. The protective tape 37 is adhered to the outermost periphery thereof, and thereby a spirally wound body as a precursor of the spirally wound electrode body 30 is formed. Subsequently, after the spirally wound body is sandwiched between 2 pieces of the film package members 40, the outermost peripheries except for one side are bonded by thermal fusion bonding or the like to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the opening of the package member 40 is hermetically sealed by thermal fusion bonding or the like. Finally, the monomer is thermally polymerized to obtain a polymer compound. Thereby, the gelatinous electrolyte 36 is formed. Accordingly, the secondary battery is completed.

In the third manufacturing method, the spirally wound body is formed and contained in the pouch-like package member 40 in the same manner as that of the foregoing second manufacturing method, except that the separator 35 with the both faces coated with a polymer compound is used firstly. As the polymer compound with which the separator 35 is coated, for example, a polymer containing vinylidene fluoride as a component, that is, a homopolymer, a copolymer, a multicomponent copolymer and the like are cited. Specifically, polyvinylidene fluoride, a binary copolymer containing vinylidene fluoride and hexafluoro propylene as a component, a ternary copolymer containing vinylidene fluoride, hexafluoro propylene, and chlorotrifluoroethylene as a component and the like are cited. As a polymer compound, in addition to the foregoing polymer containing vinylidene fluoride as a component, another one or more polymer compounds may be contained. Subsequently, an electrolytic solution is prepared and injected into the package member 40. After that, the opening of the package member 40 is sealed by thermal fusion bonding or the like. Finally, the resultant is heated while a weight is applied to the package member 40, and the separator 35 is contacted with the cathode 33 and the anode 34 with the polymer compound in between. Thereby, the electrolytic solution is impregnated into the polymer compound, and the polymer compound is gelated to form the electrolyte 36. Accordingly, the secondary battery is completed.

In the third manufacturing method, the swollenness of the secondary battery is inhibited compared to the first manufacturing method. Further, in the third manufacturing method, the monomer, the solvent and the like as a raw material of the polymer compound are hardly left in the electrolyte 36 compared to the second manufacturing method. In addition, the formation step of the polymer compound is favorably controlled. Thus, sufficient contact characteristics are obtained between the cathode 33/the anode 34/the separator 35 and the electrolyte 36.

According to the laminated film secondary battery, in the case where the capacity of the anode 34 is expressed based on inserting and extracting lithium, the cycle characteristics and the storage characteristics are able to be improved as in the first secondary battery since the secondary battery includes the foregoing electrolytic solution. Effect of the secondary battery other than the foregoing effect is similar to that of the first secondary battery.

It is needless to say that the laminated film secondary battery may have a structure similar to that of the second or the third secondary battery, in addition to the structure of the first secondary battery.

EXAMPLES

Specific examples of the invention will be described in detail.

Example 1-1

The laminated film secondary battery shown in FIG. 7 and FIG. 8 was fabricated by using silicon as a material that is capable of inserting and extracting lithium and has at least one of metal elements and metalloid elements as an anode active material by the following procedure. Then, the secondary battery was fabricated as a lithium ion secondary battery in which the capacity of the anode 34 was expressed based on insertion and extraction of lithium.

First, the cathode 33 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by mass of the lithium cobalt complex oxide as a cathode active material, 3 parts by mass of polyvinylidene fluoride as a cathode binder, and 6 parts by mass of graphite as a cathode electrical conductor were mixed to obtain a cathode mixture. After that, the cathode mixture was dispersed in N-methyl-2-pyrrolidone to obtain a paste cathode mixture slurry. Subsequently, the both faces of the cathode current collector 33A made of a strip-shaped aluminum foil (thickness: 12 μm) were uniformly coated with the cathode mixture slurry by a bar coater, which was dried. After that, the resultant was compression-molded by a roll pressing machine to form the cathode active material layer 33B.

Next, the anode 34 was formed by preparing the anode current collector 34A made of a roughened electrolytic copper foil (thickness: 15 μm), and then depositing silicon as an anode active material on the both faces of the anode current collector 34A by electron beam evaporation method so as to form the anode active material layer 34B. In forming the anode active material layer 34B, the anode active material particles were formed by ten deposition steps so that the anode active material particles had ten layer structure. Then, the thickness of the anode active material particles on a single face side of the anode current collector 34A was 6 μm.

Next, an electrolytic solution was prepared. First, ethylene carbonate (EC) and diethyl carbonate (DEC) were mixed. After that, the compound of Chemical formula 4-(1) as a sulfone compound shown in Chemical formula 1 and 4-fluoro-1,3-dioxolane-2-one (FEC) as a cyclic ester carbonate having halogen shown in Chemical formula 3 as an ester carbonate halide were added thereto to prepare a solvent. Then, the mixture ratio between EC and DEC was 30:70 at a weight ratio. The content of the compound shown in Chemical formula 4-(1) in the solvent was 0.01 wt %. The content of FEC in the solvent was 5 wt %. After that, lithium hexafluorophosphate ($LiPF_6$) as an electrolyte salt was dissolved in the solvent. Then, the content of lithium hexafluorophosphate in relation to the solvent was 1 mol/kg.

Finally, the secondary battery was assembled by using the cathode 33, the anode 34, and the electrolytic solution. First, the cathode lead 31 made of aluminum was welded to one end of the cathode current collector 33A, and the anode lead 32 made of nickel was welded to one end of the anode current collector 34A. Subsequently, the cathode 33, the separator 35 (thickness: 25 μm) made of a microporous polypropylene film, and the anode 54 were layered and spirally wound. After that, the end section of the spirally wound body was fixed by the protective tape 37 made of an adhesive tape, and thereby a spirally wound body as a precursor of the spirally wound electrode body 30 was formed. Subsequently, the spirally wound body was sandwiched between the package members 40 made of a 3-layer laminated film (total thickness: 100 μm) in which a nylon film (thickness: 30 μm), an aluminum foil (thickness: 40 μm), and a non-stretch polypropylene film (thickness: 30 μm) were layered from the outside. After that, outer edges other than an edge of one side of the package members were thermally fusion-bonded with each other. Thereby, the spirally wound body was contained in the package members 40 in a pouched state. Subsequently, the electrolytic solution was injected through the opening of the package member 40, the electrolytic solution was impregnated in the separator 35, and thereby the spirally wound electrode body 30 was formed. Finally, the opening of the package member 40 was sealed by thermal fusion bonding in the vacuum atmosphere, and thereby the laminated film secondary battery was completed. For the secondary battery, lithium metal was not precipitated on the anode 34 in a state of full charge by adjusting the thickness of the cathode active material layer 33B.

Examples 1-2 to 1-7

A procedure was performed in the same manner as that of Example 1-1, except that the content of the compound shown in Chemical formula 4-(1) was changed to 0.1 wt % (Example 1-2), 0.5 wt % (Example 1-3), 1 wt % (Example 1-4), 2 wt % (Example 1-5), 5 wt % (Example 1-6), or 10 wt % (Example 1-7).

Comparative Example 1-1

A procedure was performed in the same manner as that of Example 1-1, except that neither the compound shown in Chemical formula 4-(1) nor FEC was used.

Comparative Example 1-2

A procedure was performed in the same manner as that of Example 1-1, except that only FEC was used and the compound shown in Chemical formula 4-(1) was not used.

Comparative Example 1-3

A procedure was performed in the same manner as that of Example 1-4, except that only the compound shown in Chemical formula 4-(1) was used and FEC was not used.

The cycle characteristics and the storage characteristics for the secondary batteries of Examples 1-1 to 1-7 and Comparative examples 1-1 to 1-3 were examined. The results shown in Table 1 were obtained.

In examining the cycle characteristics, first, charge and discharge were performed 2 cycles in the atmosphere of 23 deg C., and thereby the discharge capacity at the second cycle was measured. Subsequently, the secondary battery was repeatedly charged and discharged in the same atmosphere until the total number of cycles became 100 cycles to measure the discharge capacity at the 100th cycle. Finally, the ambient temperature cycle discharge capacity retention ratio (%)=(discharge capacity at the 100th cycle/discharge capacity at the second cycle)*100 was calculated. The charge and discharge conditions were as follows. That is, after constant current and constant voltage charge was performed at a current of 0.2 C until the upper voltage reached 4.2 V, constant current discharge was performed at a current of 0.2 C until the final voltage reached 2.7 V. "0.2 C" means a current value at which the theoretical capacity is discharged up in 5 hours.

In examining the storage characteristics, first, charge and discharge were performed 2 cycles in the atmosphere of 23 deg C. to measure a discharge capacity before storage. Subsequently, the battery in a state of being recharged was stored in a constant-temperature bath at 80 deg C. for 10 days. After that, the secondary battery was discharged in the atmosphere of 23 deg C. to measure a discharge capacity after storage. Finally, the high temperature storage discharge capacity retention ratio (%)=(discharge capacity after storage/discharge capacity before storage)*100 was calculated. The charge and discharge condition was similar to that of the case examining the cycle characteristics.

The foregoing procedures and the foregoing conditions in examining the cycle characteristics and the storage characteristics are similarly applied to the following series of examples and comparative examples.

TABLE 1

Anode active material: silicon

| | Electrolyte salt | Solvent | | | | Ambient temperature cycle discharge capacity retention ratio | High temperature storage discharge capacity retention ratio |
|---|---|---|---|---|---|---|---|
| | | | Ester carbonate halide | Sulfone compound | | | |
| | (mol/kg) | Type | Type | Type | wt % | (%) | (%) |
| Example 1-1 | LiPF$_6$: 1 | EC + DEC | FEC | Chemical formula 4-(1) | 0.01 | 62 | 80 |
| Example 1-2 | | | | | 0.1 | 63 | 82 |
| Example 1-3 | | | | | 0.5 | 65 | 82 |
| Example 1-4 | | | | | 1 | 68 | 84 |
| Example 1-5 | | | | | 2 | 70 | 86 |
| Example 1-6 | | | | | 5 | 70 | 85 |
| Example 1-7 | | | | | 10 | 60 | 83 |
| Comparative example 1-1 | LiPF$_6$: 1 | EC + DEC | — | — | — | 52 | 74 |
| Comparative example 1-2 | | | FEC | | | 60 | 78 |
| Comparative example 1-3 | | | — | Chemical formula 4-(1) | 1 | 54 | 78 |

As shown in Table 1, in the case where silicon was used as an anode active material, in Examples 1-1 to 1-7 in which the solvent contained both the compound of Chemical formula 4-(1) and FEC, compared to in comparative examples 1-1 to 1-3 in which the solvent contained neither thereof, the ambient temperature cycle discharge capacity retention ratio and the high temperature storage discharge capacity retention ratio were higher independently of the content of the compound of Chemical formula 4-(1).

More specifically, in Comparative examples 1-2 and 1-3 in which the solvent contained only one of the compound of Chemical formula 4-(1) and FEC, compared to Comparative example 1-1 in which the solvent contained neither thereof, the ambient temperature cycle discharge capacity retention ratio and the high temperature storage discharge capacity retention ratio were higher. However, the ambient temperature cycle discharge capacity retention ratio and the high temperature storage discharge capacity retention ratio obtained in Comparative examples 1-2 and 1-3 were not sufficient. Meanwhile, in Examples 1-1 to 1-7 in which the solvent contained both the compound of Chemical formula 4-(1) and FEC, compared to in Comparative examples 1-2 and 1-3, the ambient temperature cycle discharge capacity retention ratio and the high temperature storage discharge capacity retention ratio were sufficiently high. The result showed the following. That is, in the case where the compound of Chemical formula 4-(1) or FEC was used singly, the ambient temperature cycle discharge capacity retention ratio and the high temperature storage discharge capacity retention ratio were not sufficiently increased. Meanwhile, in the case where the compound of Chemical formula 4-(1) and FEC were used together, the ambient temperature cycle discharge capacity retention ratio and the high temperature storage discharge capacity retention ratio were sufficiently increased.

In particular, in Examples 1-1 to 1-7, there was tendency that as the content of the compound shown in Chemical formula 4-(1) was increased, the ambient temperature cycle discharge capacity retention ratio and the high temperature storage discharge capacity retention ratio were increased and then decreased. In this case, in the case where the content was in the range from 0.01 wt % to 10 wt %, a higher ambient temperature cycle discharge capacity retention ratio and a higher high temperature storage discharge capacity retention ratio were obtained. Further, in the case where the content was smaller than 0.01 wt %, the ambient temperature cycle discharge capacity retention ratio and the high temperature storage discharge capacity retention ratio were not sufficiently high. In the case where the content was larger than 5 wt %, while a higher ambient temperature cycle discharge capacity retention ratio and a higher high temperature storage discharge capacity retention ratio were obtained, the battery capacity was easily lowered.

Only the results in the case where the compound of Chemical formula 4-(1) was used as a sulfone compound shown in Chemical formula 1 are herein shown, but no results in the case where other compound such as the compound shown in Chemical formula 4-(2) was used are herein shown. However, both the compound of Chemical formula 4-(1) and the other compounds that have the common structure that —S(=O)$_2$—S—C(=O)— bond is introduced to a benzene skeleton should fulfill a function to increase the ambient temperature cycle discharge capacity retention ratio and the high temperature storage discharge capacity retention ratio. Thus, it is evident that in the case where the other compounds are used, effect similar to that in the case where the compound of Chemical formula 4-(1) is used is obtained as well. The same is applied to a case that a given mixture obtained by mixing two or more of the foregoing compound of Chemical formula 4-(1) and the like is used.

Accordingly, it was confirmed that in the secondary battery of an embodiment of the invention, in the case where the anode 34 contained silicon as an anode active material, and the solvent of the electrolytic solution contained the sulfone compound shown in Chemical formula 1 and the cyclic ester carbonate having halogen shown in Chemical formula 3, the cycle characteristics and the storage characteristics were improved. It was also confirmed that in this case, in the case where the content of the sulfone compound in the solvent was in the range from 0.01 wt % to 5 wt %, a superior battery capacity, superior cycle characteristics, and superior storage characteristics were obtained.

Examples 2-1 and 2-2

A procedure was performed in the same manner as that of Example 1-4, except that dimethyl carbonate (DMC: Example 2-1) or ethylmethyl carbonate (EMC: Example 2-2) was used as a solvent instead of DEC.

Example 2-3

A procedure was performed in the same manner as that of Example 1-4, except that propylene carbonate (PC) was added as a solvent, and the mixture ratio of EC, PC, and DEC was 10:20:70 at a weight ratio.

Example 2-4

A procedure was performed in the same manner as that of Example 1-4, except that EC was not used as a solvent, and the mixture ratio of FEC and DEC was 30:70 at a weight ratio.

Example 2-5

A procedure was performed in the same manner as that of Example 1-4, except that as a solvent, trans-4,5-difluoro-1,3-dioxolane-2-one (t-DFEC) was used instead of FEC.

Example 2-6

A procedure was performed in the same manner as that of Example 1-4, except that as a solvent, PC and t-DFEC were respectively used instead of EC and FEC.

Example 2-7

A procedure was performed in the same manner as that of Example 1-4, except that as a solvent, PC was used instead of EC, t-DFEC was added, and the content of FEC and t-DFEC in the solvent was 2.5 wt % respectively.

Example 2-8

A procedure was performed in the same manner as that of Example 1-4, except that as a solvent, cis-4,5-difluoro-1,3-dioxolane-2-one (c-DFEC) was used instead of FEC.

Example 2-9

A procedure was performed in the same manner as that of Example 1-4, except that as a solvent, bis(fluoromethyl) carbonate (DFDMC) as a chain ester carbonate having halogen shown in Chemical formula 2 was used instead of FEC.

Comparative Examples 2-1 and 2-2

A procedure was performed in the same manner as that of Examples 2-4 and 2-5, except that the compound of Chemical formula 4-(1) was not used.

The cycle characteristics and the storage characteristics for the secondary batteries of Examples 2-1 to 2-9 and Comparative examples 2-1 and 2-2 were examined. The results shown in Table 2 were obtained.

TABLE 2

| | Electrolyte salt (mol/kg) | Solvent Type | Ester carbonate halide Type | Sulfone compound Type | wt % | Ambient temperature cycle discharge capacity retention ratio (%) | High temperature storage discharge capacity retention ratio (%) |
|---|---|---|---|---|---|---|---|
| | | | | Anode active material: silicon | | | |
| Example 1-4 | LiPF$_6$: 1 | EC + DEC | FEC | Chemical formula 4-(1) | 1 | 68 | 84 |
| Example 2-1 | | EC + DMC | | | | 69 | 86 |
| Example 2-2 | | EC + EMC | | | | 69 | 86 |
| Example 2-3 | | EC + PC + DEC | | | | 70 | 87 |
| Example 2-4 | | DEC | | | | 85 | 88 |
| Example 2-5 | | EC + DEC | t-DFEC | | | 90 | 90 |
| Example 2-6 | | PC + DEC | | | | 90 | 88 |
| Example 2-7 | | | FEC + t-DFEC | | | 95 | 88 |
| Example 2-8 | | EC + DEC | c-DFEC | | | 90 | 90 |
| Example 2-9 | | | DFDMC | | | 65 | 88 |
| Comparative example 1-1 | LiPF$_6$: 1 | EC + DEC | — | — | — | 52 | 74 |
| Comparative example 1-2 | | | FEC | | | 60 | 78 |
| Comparative example 1-3 | | | — | Chemical formula 4-(1) | 1 | 54 | 78 |
| Comparative example 2-1 | | DEC | FEC | — | — | 80 | 78 |
| Comparative example 2-2 | | EC + DEC | t-DFEC | | | 80 | 83 |

As shown in Table 2, in Examples 2-1 to 2-9 in which the solvent composition was changed by using t-DFEC or the like, compared to in Comparative examples 1-1 to 1-3, 2-1, and 2-2, the ambient temperature cycle discharge capacity retention ratio and the high temperature storage discharge capacity retention ratio were higher as in Example 1-4.

In particular, in Examples 2-1 to 2-3 in which DEC was changed to DMC or the like, or PC was added, a higher ambient temperature cycle discharge capacity retention ratio and a higher high temperature storage discharge capacity retention ratio were obtained compared to in Example 1-4.

Further, in Examples 2-5 to 2-9 in which t-DFEC or the like was used singly or by mixture instead of FEC, compared to Comparative examples 1-1 to 1-3, the ambient temperature cycle discharge capacity retention ratio and the high temperature storage discharge capacity retention ratio were higher as in Example 1-4 in which FEC was used. In particular, for the ester carbonate halide, as evidenced by comparison between Examples 1-4 and 2-5, there was a tendency that as the number of halogen was larger, the ambient temperature cycle discharge capacity retention ratio and the high temperature storage discharge capacity retention ratio were higher.

Accordingly, it was confirmed that in the secondary battery of an embodiment of the invention in which the anode 34 contained silicon as an anode active material, in the case where the solvent of the electrolytic solution contained the sulfone compound shown in Chemical formula 1 and at least one of the chain ester carbonate having halogen shown in Chemical formula 2 and the cyclic ester carbonate having halogen shown in Chemical formula 3, the cycle characteristics and the storage characteristics were improved. Further, it was also confirmed that for the ester carbonate halide, as the number of halogen was larger, the characteristics were more improved.

Examples 3-1 to 3-3

A procedure was performed in the same manner as that of Example 1-4, except that vinylene carbonate as a cyclic ester carbonate having an unsaturated bond shown in Chemical formula 9 (VC: Example 3-1), propene sultone as sultone (PRS: Example 3-2), or sulfobenzoic anhydride as an acid anhydride (SBAH: Example 3-3) was added as a solvent. Then, the content of VC in the solvent was 5 wt %, and the content of PRS or SBAH in the solvent was 1 wt %.

Comparative Example 3

A procedure was performed in the same manner as that of Example 3-1, except that neither the compound shown in Chemical formula 4-(1) nor FEC was used.

The cycle characteristics and the storage characteristics for the secondary batteries of Examples 3-1 to 3-3 and Comparative example 3 were examined. The results shown in Table 3 were obtained.

TABLE 3

| | | Solvent | | | | Ambient temperature cycle discharge capacity retention ratio | High temperature storage discharge capacity retention ratio |
|---|---|---|---|---|---|---|---|
| | Electrolyte salt | Ester carbonate halide | Sulfone compound | | Others | | |
| | (mol/kg) | Type | Type | wt % | Type | (%) | (%) |
| Example 1-4 | LiPF$_6$: 1 | EC + DEC | FEC | Chemical formula 4-(1) | 1 | — | 68 | 84 |
| Example 3-1 | | | | | | VC | 85 | 88 |
| Example 3-2 | | | | | | PRS | 68 | 86 |
| Example 3-3 | | | | | | SBAH | 68 | 85 |
| Comparative example 1-1 | LiPF$_6$: 1 | EC + DEC | — | — | — | — | 52 | 74 |
| Comparative example 1-2 | | | FEC | | | | 60 | 78 |
| Comparative example 1-3 | | | — | Chemical formula 4-(1) | 1 | | 54 | 78 |
| Comparative example 3 | | | — | — | — | VC | 70 | 76 |

As shown in Table 3, in Examples 3-1 to 3-3 in which the solvent composition was changed by using VC or the like, compared to in Comparative examples 1-1 to 1-3 and 3, the ambient temperature cycle discharge capacity retention ratio and the high temperature storage discharge capacity retention ratio were higher as in Example 1-4.

In particular, in Examples 3-1 to 3-3 in which VC or the like was added, the ambient temperature cycle discharge capacity retention ratio and the high temperature storage discharge capacity retention ratio equal to or higher than those of Example 1-4 were obtained.

Only the results in the case where the cyclic ester carbonate having an unsaturated bond shown in Chemical formula 9 (vinylene carbonate compound) was used as a solvent are herein shown, but no results in the case where the cyclic ester carbonate having an unsaturated bond shown in Chemical formula 10 or Chemical formula 11 (vinylethylene carbonate compound or the like) was used are herein shown. However, the vinylethylene carbonate compound or the like fulfills a function to increase the ambient temperature cycle discharge capacity retention ratio and the high temperature storage discharge capacity retention ratio as the vinylene carbonate compound does. Thus, it is evident that in the case where the former is used, effect similar to that in the case where the latter is used is obtained as well. The same is applied to a case that a given mixture obtained by mixing two or more of the foregoing vinylene carbonate compound and the like is used.

Accordingly, it was confirmed that in the secondary battery of an embodiment of the invention in which the anode 34 contains silicon as an anode active material, in the case where the solvent composition was changed by using the cyclic ester carbonate having an unsaturated bond shown in Chemical formula 9 to Chemical formula 11, sultone, or the acid anhydride, the cycle characteristics and the storage characteristics were improved. It was also confirmed that in this case, in the case where the foregoing cyclic ester carbonate having an unsaturated bond shown in Chemical formula 9 to Chemical formula 11 or the like was used, the characteristics were more improved.

Examples 4-1 to 4-3

A procedure was performed in the same manner as that of Example 1-4, except that lithium tetrafluoroborate (LiBF$_4$: Example 4-1), the compound shown in Chemical formula 15-(6) as a compound shown in Chemical formula 12 (Example 4-2), or lithium bis(trifluoromethanesulfonyl)imide as a compound shown in Chemical formula 18 (LiTFSI: Example 4-3) was added as an electrolyte salt. Then, the content of lithium hexafluorophosphate in relation to the solvent was 0.9 mol/kg, and the content of lithium tetrafluoroborate or the like in relation to the solvent was 0.1 mol/kg.

Example 4-4

A procedure was performed in the same manner as that of Example 4-1, except that as a solvent, PC was used instead of EC, t-DFEC was added, and the content of FEC and t-DFEC in the solvent was 2.5 wt % respectively.

Comparative Examples 4-1 to 4-3

A procedure was performed in the same manner as that of Examples 4-1 to 4-3, except that neither the compound shown in Chemical formula 4-(1) nor FEC was used.

The cycle characteristics and the storage characteristics for the secondary batteries of Examples 4-1 to 4-4 and Comparative examples 4-1 to 4-3 were examined. The results shown in Table 4 were obtained.

TABLE 4

Anode active material: silicon

| | Electrolyte salt (mol/kg) | Solvent Type | Ester carbonate halide Type | Sulfone compound Type | Sulfone compound wt % | Ambient temperature cycle discharge capacity retention ratio (%) | High temperature storage discharge capacity retention ratio (%) |
|---|---|---|---|---|---|---|---|
| Example 1-4 | $LiPF_6$: 1 | EC + DEC | FEC | Chemical formula 4-(1) | 1 | 68 | 84 |
| Example 4-1 | $LiPF_6$: 0.9   $LiBF_4$: 0.1 | | | | | 68 | 86 |
| Example 4-2 | Chemical formula 15-(6): 0.1 | | | | | 70 | 86 |
| Example 4-3 | LiTFSI: 0.1 | | | | | 68 | 87 |
| Example 4-4 | $LiBF_4$: 0.1 | PC + DEC | FEC + t-DFEC | | | 95 | 90 |
| Comparative example 1-1 | $LiPF_6$: 1 | EC + DEC | — | — | — | 52 | 74 |
| Comparative example 1-2 | | | FEC | | | 60 | 78 |
| Comparative example 1-3 | | | — | Chemical formula 4-(1) | 1 | 54 | 78 |
| Comparative example 4-1 | $LiPF_6$: 0.9   $LiBF_4$: 0.1 | | | — | — | 60 | 78 |
| Comparative example 4-2 | Chemical formula 15-(6): 0.1 | | | | | 62 | 82 |
| Comparative example 4-3 | LiTFSI: 0.1 | | | | | 60 | 82 |

As shown in Table 4, in Examples 4-1 to 4-4 in which the electrolyte salt type was changed by using lithium tetrafluoroborate or the like, compared to Comparative examples 1-1 to 1-3 and 4-1 to 4-3, the ambient temperature cycle discharge capacity retention ratio and the high temperature storage discharge capacity retention ratio were higher as in Example 1-4.

In particular, in Examples 4-1 to 4-4 in which lithium tetrafluoroborate or the like was added, an ambient temperature cycle discharge capacity retention ratio and a high temperature storage discharge capacity retention ratio equal to or more than those of Example 1-4 were obtained.

Only the results in the case where lithium tetrafluoroborate, the compound shown in Chemical formula 12, or the compound shown in chemical formula 18 was used as an electrolyte salt are herein shown, but no results in the case where lithium perchlorate, lithium hexafluoroarsenate, or the compound shown in Chemical formula 13, 14, 19, or 20 is used are herein shown. However, lithium perchlorate or the like fulfills a function to increase the ambient temperature cycle discharge capacity retention ratio and the high temperature storage discharge capacity retention ratio as lithium tetrafluoroborate or the like does. Thus, it is evident that in the case where the former was used, effect similar to that in the case where the latter is used is obtained as well. The same is applied to a case that a given mixture obtained by mixing two or more of the foregoing lithium tetrafluoroborate and the like is used.

Accordingly, it was confirmed that in the secondary battery of an embodiment of the invention in which the anode 34 contained silicon as an anode active material, in the case where the electrolyte salt type was changed by using lithium tetrafluoroborate, lithium perchlorate, lithium hexafluoroarsenate, the compounds shown in Chemical formula 12 to Chemical formula 14, or the compounds shown in Chemical formula 18 to Chemical formula 20, the cycle characteristics and the storage characteristics were improved as well. It was also confirmed that in this case, in the case where the foregoing lithium tetrafluoroborate or the like was used, the characteristics were more improved.

Example 5

A procedure was performed in the same manner as that of Example 1-4, except that an SnCoC-containing material as a material that is capable of inserting and extracting lithium and has at least one of metal elements and metalloid elements like silicon was used as an anode active material instead of silicon.

In forming the anode active material layer 34B by using the SnCoC-containing material, first, cobalt powder and tin powder were alloyed to obtain cobalt-tin alloy powder, to which the carbon powder was added subsequently, and then the resultant was dry-blended. Subsequently, 10 g of the foregoing mixture together with about 400 g of a corundum having a diameter of 9 mm were set in a reactive vessel of a planetary ball mill, Itoh Seisakusho Co., Ltd. make. Subsequently, inside of the reactive vessel was substituted with argon atmosphere. After that, 10 minute operation at 250 rpm and 10 minute stop were repeated until the total operation time became 20 hours. Subsequently, the reactive vessel was cooled down to room temperature, and the SnCoC-containing material was taken out. After that, coarse grain was removed therefrom with the use of a 280 mesh sieve.

Figure 9:
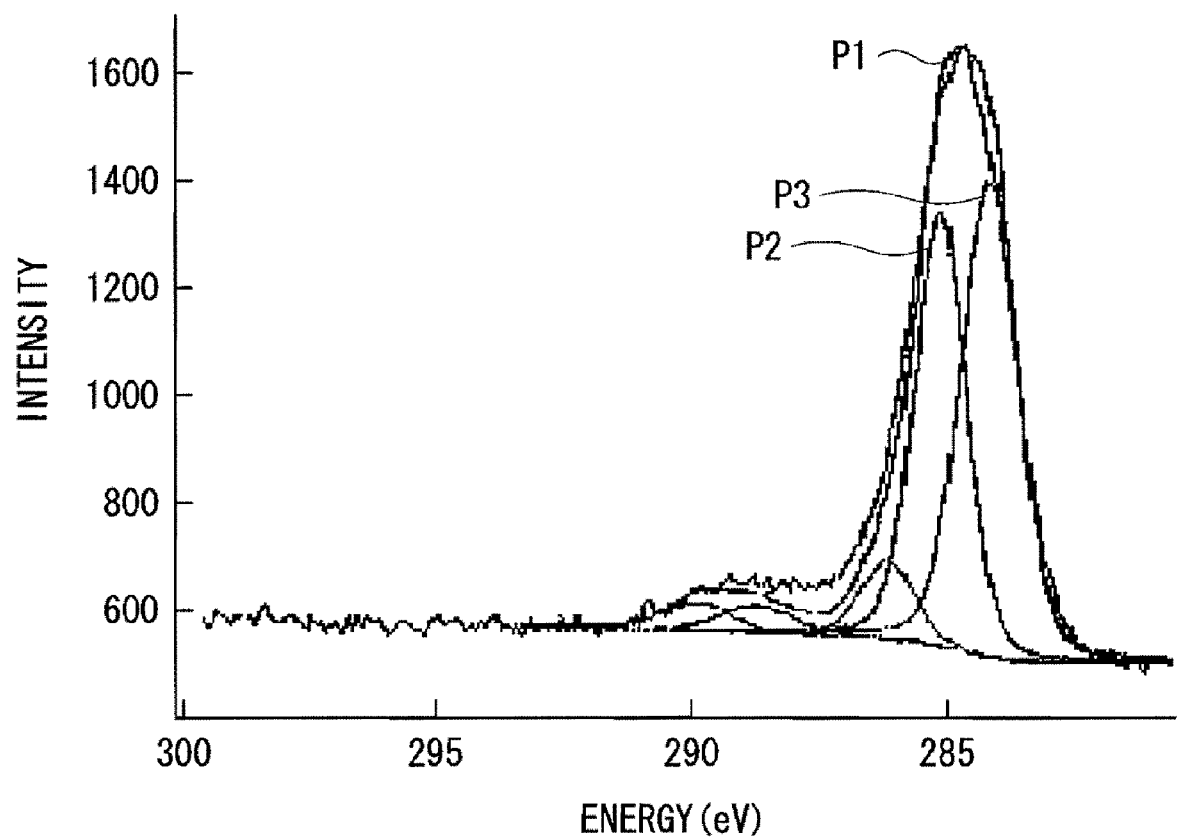
FIG. 9 is a diagram showing analysis results of a SnCoC-containing material by XPS.

When the composition of the obtained SnCoC-containing material was analyzed, the tin content was 49.5 wt %, the cobalt content was 29.7 wt %, the carbon content was 19.8 wt %, and the cobalt ratio in relation to the total of tin and cobalt (Co/(Sn+Co)) was 37.5 wt %. Then, the tin content and the cobalt content were measured by Inductively Coupled Plasma (ICP) optical emission spectroscopy. The carbon content was measured by a carbon sulfur analyzer. Further, the SnCoC-containing material was analyzed by X-ray diffraction method. In result, the diffraction peak having the half bandwidth in the range of the diffraction angle 2θ=20 to 50 degree was observed. Furthermore, when the SnCoC-containing material was analyzed by XPS, Peak P1 was obtained as shown in FIG. 9. When Peak P1 was analyzed, Peak P2 of the surface contamination carbon and Peak P3 of C1s in the SnCoC-containing material on the energy side lower than that of Peak P2 (region lower than 284.5 eV) were obtained. From the result, it was confirmed that carbon in the SnCoC-containing material was bonded with other element.

After the SnCoC-containing material was obtained, 80 parts by mass of the SnCoC-containing material as the anode active material, 8 parts by mass of polyvinylidene fluoride as an anode binder, and 11 parts by mass of graphite and 1 part by mass of acetylene black as an anode electrical conductor were mixed to obtain an anode mixture. After that, the mixture was dispersed in N-methyl-2-pyrrolidone to obtain a paste anode mixture slurry. Subsequently, the both faces of the anode current collector 34A made of a strip-shaped electrolytic copper foil (thickness: 15 μm) was uniformly coated with the anode mixture slurry by a bar coater, and then the resultant coating film was dried and compression-molded by a rolling press machine. Then, the thickness of the anode active material layer 34B on a single face side of the anode current collector 34A was 50 μm.

Comparative Examples 5-1 to 5-3

A procedure was performed in the same manner as that of Comparative examples 1-1 to 1-3, except that the SnCoC-containing material was used as an anode active material as in Example 5.

The cycle characteristics and the storage characteristics for the secondary batteries of Example 5 and Comparative examples 5-1 to 5-3 were examined. The results shown in Table 5 were obtained.

compound of Chemical formula 4-(1) and FEC, compared to Comparative examples 5-1 to 5-3 in which the solvent contained neither thereof, the ambient temperature cycle discharge capacity retention ratio and the high temperature storage discharge capacity retention ratio were higher.

Accordingly, it was confirmed that in the secondary battery of an embodiment of the invention, in the case where the anode 34 contained the SnCoC-containing material as an anode active material and the solvent of the electrolytic solution contained the sulfone compound shown in Chemical formula 1 and at least one of the chain ester carbonate having halogen shown in Chemical formula 2 and the cyclic ester carbonate having halogen shown in Chemical formula 3, the cycle characteristics and the storage characteristics were improved.

Examples 6-1 to 6-7

A procedure was performed in the same manner as that of Examples 1-1 to 1-7, except that as an anode active material, artificial graphite as a carbon material was used instead of silicon. In forming the anode active material layer 34B with the use of the artificial graphite, first, 90 parts by mass of the artificial graphite as an anode active material and 10 parts by mass of polyvinylidene fluoride as an anode binder were mixed to obtain an anode mixture. After that, the anode mixture was dispersed in N-methyl-2-pyrrolidone to obtain a paste anode mixture slurry. Subsequently, the both faces of the anode current collector 34A made of a strip-shaped electrolytic copper foil (thickness: 15 μm) were uniformly coated with the anode mixture slurry by a bar coater, which was dried. Finally, the resultant coating film was compression-molded by a roll pressing machine. Then, the thickness of the anode active material layer 34B on a single face side of the anode current collector 34A was 75 μm.

Comparative Examples 6-1 to 6-3

A procedure was performed in the same manner as that of Comparative Examples 1-1 to 1-3, except that as an anode active material, artificial graphite was used as in Examples 6-1 to 6-7.

TABLE 5

Anode active material: SnCoC-containing material

| | Electrolyte salt | Solvent | | Sulfone compound | | Ambient temperature cycle discharge capacity retention ratio | High temperature storage discharge capacity retention ratio |
|---|---|---|---|---|---|---|---|
| | | Type | Ester carbonate halide Type | Type | wt % | (%) | (%) |
| | (mol/kg) | | | | | | |
| Example 5 | LiPF$_6$: 1 | EC + DEC | FEC | Chemical formula 4-(1) | 1 | 86 | 92 |
| Comparative example 5-1 | LiPF$_6$: 1 | EC + DEC | — | — | — | 76 | 70 |
| Comparative example 5-2 | | | FEC | | | 84 | 90 |
| Comparative example 5-3 | | | — | Chemical formula 4-(1) | 1 | 77 | 75 |

As shown in Table 5, in the case where the SnCoC-containing material was used as an anode active material, results similar to the results shown in Table 1 were obtained as well. That is, in Example 5 in which the solvent contained both the The cycle characteristics and the storage characteristics for the secondary batteries of Examples 6-1 to 6-7 and Comparative examples 6-1 to 6-3 were examined. The results shown in Table 6 were obtained.

TABLE 6

Anode active material: artificial graphite

| | Electrolyte salt (mol/kg) | Solvent Ester carbonate halide Type | | Sulfone compound Type | wt % | Ambient temperature cycle discharge capacity retention ratio (%) | High temperature storage discharge capacity retention ratio (%) |
|---|---|---|---|---|---|---|---|
| | | Type | | | | | |
| Example 6-1 | LiPF$_6$: 1 | EC + DEC | FEC | Chemical formula 4-(1) | 0.01 | 94 | 92 |
| Example 6-2 | | | | | 0.1 | 94 | 92 |
| Example 6-3 | | | | | 0.5 | 95 | 93 |
| Example 6-4 | | | | | 1 | 95 | 94 |
| Example 6-5 | | | | | 2 | 96 | 96 |
| Example 6-6 | | | | | 5 | 92 | 95 |
| Example 6-7 | | | | | 10 | 90 | 94 |
| Comparative example 6-1 | LiPF$_6$: 1 | EC + DEC | — | — | — | 89 | 84 |
| Comparative example 6-2 | | | FEC | | | 93 | 90 |
| Comparative example 6-3 | | | — | Chemical formula 4-(1) | 1 | 90 | 86 |

As shown in Table 6, in the case where the artificial graphite was used as an anode active material, a result similar to the results shown in Table 1 was obtained. That is, in Examples 6-1 to 6-7 in which the solvent contained both the compound of Chemical formula 4-(1) and FEC, compared to in Comparative examples 6-1 to 6-3 in which the solvent contained neither thereof, the ambient temperature cycle discharge capacity retention ratio and the high temperature storage discharge capacity retention ratio were higher. Further, in Examples 6-1 to 6-7, in the case where the content of the compound of Chemical formula 4-(1) was in the range from 0.01 wt % to 10 wt %, a higher ambient temperature cycle discharge capacity retention ratio and a higher high temperature storage discharge capacity retention ratio were obtained. Further, in the case where the content of the compound of Chemical formula 4-(1) was larger than 5 wt %, the battery capacity was easily lowered.

Accordingly, it was confirmed that in the secondary battery of an embodiment of the invention, in the case where the anode 34 contained the artificial graphite as an anode active material, and the solvent of the electrolytic solution contained the sulfone compound shown in Chemical formula 1 and at least one of the chain ester carbonate having halogen shown in Chemical formula 2 and the cyclic ester carbonate having halogen shown in Chemical formula 3, the cycle characteristics and the storage characteristics were improved. It was also confirmed that in this case, in the case where the content of the sulfone compound in the solvent was in the range from 0.01 wt % to 5 wt %, a superior battery capacity, superior cycle characteristics, and superior storage characteristics were obtained.

Examples 7-1 to 7-6

A procedure was performed in the same manner as that of Examples 2-1 to 2-3, 2-5, 2-8, and 2-9 except that as an anode active material, artificial graphite was used as in Examples 6-1 to 6-7.

Comparative Example 7

A procedure was performed in the same manner as that of Comparative example 2-2 except that as an anode active material, artificial graphite was used as in Examples 6-1 to 6-7.

The cycle characteristics and the storage characteristics for the secondary batteries of Examples 7-1 to 7-6 and Comparative example 7 were examined. The results shown in Table 7 were obtained.

TABLE 7

Anode active material: silicon

| | Electrolyte salt (mol/kg) | Solvent Type | Ester carbonate halide Type | Sulfone compound Type | wt % | Ambient temperature cycle discharge capacity retention ratio (%) | High temperature storage discharge capacity retention ratio (%) |
|---|---|---|---|---|---|---|---|
| Example 6-4 | LiPF$_6$: 1 | EC + DEC | FEC | Chemical formula 4-(1) | 1 | 95 | 94 |
| Example 7-1 | | EC + DMC | | | | 97 | 97 |
| Example 7-2 | | EC + EMC | | | | 96 | 97 |
| Example 7-3 | | EC + PC + DEC | | | | 95 | 97 |

TABLE 7-continued

Anode active material: silicon

| | Electrolyte salt | | Solvent | | | Ambient temperature cycle discharge capacity retention ratio | High temperature storage discharge capacity retention ratio |
|---|---|---|---|---|---|---|---|
| | | | Ester carbonate halide | Sulfone compound | | | |
| | (mol/kg) | Type | Type | Type | wt % | (%) | (%) |
| Example 7-4 | | EC + DEC | t-DFEC | | | 96 | 95 |
| Example 7-5 | | | c-DFEC | | | 96 | 95 |
| Example 7-6 | | | DFDMC | | | 95 | 95 |
| Comparative example 6-1 | LiPF$_6$: 1 | EC + DEC | — | — | — | 89 | 84 |
| Comparative example 6-2 | | | FEC | | | 93 | 90 |
| Comparative example 6-3 | | | — | Chemical formula 4-(1) | 1 | 90 | 86 |
| Comparative example 7 | | | t-DFEC | — | | 94 | 91 |

As shown in Table 7, in the case where the artificial graphite was used as an anode active material, a result similar to the results shown in Table 2 was obtained as well. That is, in Examples 7-1 to 7-6, compared to in Comparative examples 6-1 to 6-3 and 7, the ambient temperature cycle discharge capacity retention ratio and the high temperature storage discharge capacity retention ratio were higher as in Example 6-4.

Accordingly, it was confirmed that in the secondary battery of an embodiment of the invention in which the anode 34 contained the artificial graphite as an anode active material, in the case where the solvent of the electrolytic solution contained the sulfone compound shown in Chemical formula 1 and at least one of the chain ester carbonate having halogen shown in Chemical formula 2 and the cyclic ester carbonate having halogen shown in Chemical formula 3, the cycle characteristics and the storage characteristics were improved.

Examples 8-1 to 8-3

A procedure was performed in the same manner as that of Examples 3-1 to 3-3 except that as an anode active material, artificial graphite was used as in Examples 6-1 to 6-7.

Comparative Example 8

A procedure was performed in the same manner as that of Comparative example 3 except that as an anode active material, artificial graphite was used as in Examples 6-1 to 6-7.

The cycle characteristics and the storage characteristics for the secondary batteries of Examples 8-1 to 8-3 and Comparative example 8 were examined. The results shown in Table 8 were obtained.

TABLE 8

Anode active material: artificial graphite

| | Electrolyte salt | | Solvent | | | | Ambient temperature cycle discharge capacity retention ratio | High temperature storage discharge capacity retention ratio |
|---|---|---|---|---|---|---|---|---|
| | | | Ester carbonate halide | Sulfone compound | | Others | | |
| | (mol/kg) | Type | Type | Type | wt % | Type | (%) | (%) |
| Example 6-4 | LiPF$_6$: 1 | EC + DEC | FEC | Chemical formula 4-(1) | 1 | — | 95 | 94 |
| Example 8-1 | | | | | | VC | 97 | 95 |
| Example 8-2 | | | | | | PRS | 95 | 96 |
| Example 8-3 | | | | | | SBAH | 95 | 95 |
| Comparative example 6-1 | LiPF$_6$: 1 | EC + DEC | — | — | — | — | 89 | 84 |
| Comparative example 6-2 | | | FEC | | | | 93 | 90 |
| Comparative example 6-3 | | | — | Chemical formula 4-(1) | 1 | | 90 | 86 |
| Comparative example 8 | | | — | | | VC | 92 | 90 |

As shown in Table 8, in the case where the artificial graphite was used as an anode active material, a result similar to the results shown in Table 3 was obtained as well. That is, in Examples 8-1 to 8-3, compared to in Comparative examples 6-1 to 6-3 and 8, the ambient temperature cycle discharge capacity retention ratio and the high temperature storage discharge capacity retention ratio were higher as in Example 6-4.

Accordingly, it was confirmed that in the secondary battery of an embodiment of the invention in which the anode 34 contained the artificial graphite as an anode active material, in the case where the solvent composition was changed by using the cyclic ester carbonate having an unsaturated bond shown in Chemical formula 9 to Chemical formula 11, sultone, or the acid anhydride, the cycle characteristics and the storage characteristics were improved as well. It was also confirmed that in this case, in the case where the foregoing cyclic ester carbonate having an unsaturated bond shown in Chemical formula 9 to Chemical formula 11 or the like was used, the characteristics were more improved.

Examples 9-1 to 9-3

A procedure was performed in the same manner as that of Examples 4-1 to 4-3 except that as an anode active material, artificial graphite was used as in Examples 6-1 to 6-7.

Comparative Examples 9-1 to 9-3

A procedure was performed in the same manner as that of Comparative examples 4-1 to 4-3 except that as an anode active material, artificial graphite was used as in Examples 6-1 to 6-7.

The cycle characteristics and the storage characteristics for the secondary batteries of Examples 9-1 to 9-3 and Comparative examples 9-1 to 9-3 were examined. The results shown in Table 9 were obtained.

As shown in Table 9, in the case where the artificial graphite was used as an anode active material, a result similar to the results shown in Table 4 was obtained. That is, in Examples 9-1 to 9-3, compared to in Comparative examples 6-1 to 6-3 and 9-1 to 9-3, the ambient temperature cycle discharge capacity retention ratio and the high temperature storage discharge capacity retention ratio were higher as in Example 6-4.

Accordingly, it was confirmed that in the secondary battery of an embodiment of the invention in which the anode 34 contained the artificial graphite as an anode active material, in the case where the electrolyte salt type was changed by using lithium tetrafluoroborate, lithium perchlorate, lithium hexafluoroarsenate, the compounds shown in Chemical formula 12 to Chemical formula 14, or the compounds shown in Chemical formula 18 to Chemical formula 20, the cycle characteristics and the storage characteristics were improved as well. It was also confirmed that in this case, in the case where the foregoing lithium tetrafluoroborate or the like was used, the characteristics were more improved.

Example 10-1

A procedure was performed in the same manner as that of Example 1-4, except that in forming the anode active material layer 34B, after the plurality of anode active material particles were formed, silicon oxide ($SiO_2$) was precipitated as an oxide-containing film on the surface of the anode active material particles by liquid-phase precipitation method. In forming the oxide-containing film, the anode current collector 34A on which the anode active material particles were formed was dipped in a solution in which boron as an anion capture agent was dissolved in hydrofluosilic acid for 3 hours, the silicon oxide was precipitated on the surface of the anode active material particles, and then the resultant was washed with water and dried under reduced pressure.

TABLE 9

| | Anode active artificial graphite | | | | | | |
|---|---|---|---|---|---|---|---|
| | | | Solvent | | | Ambient temperature cycle discharge capacity retention ratio | High temperature storage discharge capacity retention ratio |
| | Electrolyte salt | | Ester carbonate halide | Sulfone compound | | | |
| | (mol/kg) | | Type | Type | Type | wt % | (%) | (%) |
| Example 6-4 | $LiPF_6$: 1 | | EC + DEC | FEC | Chemical formula 4-(1) | 1 | 95 | 94 |
| Example 9-1 | $LiPF_6$: 0.9 | $LiBF_4$: 0.1 | | | | | 95 | 95 |
| Example 9-2 | | Chemical formula 15-(6): 0.1 | | | | | 95 | 96 |
| Example 9-3 | | LiTFSI: 0.1 | | | | | 95 | 96 |
| Comparative example 6-1 | $LiPF_6$: 1 | | EC + DEC | — | — | — | 89 | 84 |
| Comparative example 6-2 | | | | FEC | | | 93 | 90 |
| Comparative example 6-3 | | | | — | Chemical formula 4-(1) | 1 | 90 | 86 |
| Comparative example 9-1 | $LiPF_6$: 0.9 | $LiBF_4$: 0.1 | | | — | — | 88 | 85 |
| Comparative example 9-2 | | Chemical formula 15-(6): 0.1 | | | | | 90 | 88 |
| Comparative example 9-3 | | LiTFSI: 0.1 | | | | | 90 | 89 |

Example 10-2

A procedure was performed in the same manner as that of Example 10-1, except that as an ester carbonate halide, t-DFEC was used instead of FEC.

Comparative Example 10-1

A procedure was performed in the same manner as that of Example 10-1, except that neither the compound shown in Chemical formula 4-(1) nor FEC was used.

Comparative Examples 10-2 and 10-3

A procedure was performed in the same manner as that of Examples 10-1 and 10-2, except that the compound shown in Chemical formula 4-(1) was not used.

The cycle characteristics and the storage characteristics for the secondary batteries of Examples 10-1 and 10-2 and Comparative examples 10-1 to 10-3 were examined. The results shown in Table 10 were obtained.

results in the case where a germanium oxide or a tin oxide is used are herein shown. However, the germanium oxide or the like fulfills a function to increase the ambient temperature cycle discharge capacity retention ratio and the high temperature storage discharge capacity retention ratio as the silicon oxide does. Thus, it is evident that in the case where the former is used, effect similar to that in the case where the latter is used is obtained.

Accordingly, it was confirmed that in the secondary battery of an embodiment of the invention, in the case where the oxide-containing film was formed, the cycle characteristics and the storage characteristics were improved as well. In addition, it was confirmed that in the case where the oxide-containing film was formed, the characteristics were more improved.

Example 11-1

A procedure was performed in the same manner as that of Example 1-4, except that in forming the anode active material

TABLE 10

| | Anode | Electrolytic solution | | | | Ambient temperature | High temperature storage |
|---|---|---|---|---|---|---|---|
| | | | Solvent | | | cycle discharge | discharge |
| | Oxide-containing film | Electrolyte salt (mol/kg) | Type | Ester carbonate halide Type | Sulfone compound Type | capacity retention ratio (%) | capacity retention ratio (%) |
| | | | | | wt % | | |
| Example 1-4 | — | LiPF$_6$: 1 | EC + DEC | FEC | Chemical formula 4-(1)    1 | 68 | 84 |
| Example 10-1 | SiO$_2$ | | | FEC | Chemical formula 4-(1) | 92 | 92 |
| Example 10-2 | | | | t-DFEC | | 94 | 93 |
| Comparative example 1-1 | — | LiPF$_6$: 1 | EC + DEC | — | — | 52 | 74 |
| Comparative example 1-2 | | | | FEC | | 60 | 78 |
| Comparative example 1-3 | | | | — | Chemical formula 4-(1)    1 | 54 | 78 |
| Comparative example 10-1 | SiO$_2$ | | | — | — | 70 | 85 |
| Comparative example 10-2 | | | | FEC | | 88 | 90 |
| Comparative example 10-3 | | | | DFEC | | 90 | 90 |

As shown in Table 10, in the case where the oxide-containing film was formed, a result similar to the results shown in Table 1 and Table 2 was obtained as well. That is, in Examples 10-1 and 10-2 in which the solvent contained both the compound of Chemical formula 4-(1) and FEC or the like, compared to Comparative examples 1-1 to and 10-1 to 10-3 in which the solvent contained neither thereof, the ambient temperature cycle discharge capacity retention ratio and the high temperature storage discharge capacity retention ratio were higher as in Example 1-4.

In particular, in Example 10-1 in which the oxide-containing film was formed, compared to Example 1-4, the ambient temperature cycle discharge retention ratio and the high temperature storage discharge capacity retention ratio were higher.

Only the result in the case where the silicon oxide was formed as the oxide-containing film is herein shown, but no layer 34B, after the plurality of anode active material particles were formed, a cobalt (Co) plating film was grown as a metal material by electrolytic plating method. In forming the metal material, a current was applied while air was supplied to a plating bath, and thereby cobalt was deposited on the both faces of the anode current collector 34A. Then, as a plating solution, a cobalt plating solution, Japan Pure Chemical Co., Ltd. make was used, the current density was in the range from 2 A/dm$^2$ to 5 A/dm$^2$, and the plating rate was 10 nm/sec.

Example 1-2

A procedure was performed in the same manner as that of Example 11-1, except that as an ester carbonate halide, t-DFEC was used instead of FEC.

Comparative Example 11-1

A procedure was performed in the same manner as that of Example 11-1, except that neither the compound shown in Chemical formula 4-(1) nor FEC was used.

Comparative Examples 11-2 and 11-3

A procedure was performed in the same manner as that of Examples 11-1 and 11-2, except that the compound of Chemical formula 4-(1) was not used.

The cycle characteristics and the storage characteristics for the secondary batteries of Examples 11-1 and 11-2 and Comparative examples 11-1 to 11-3 were examined. The results shown in Table 11 were obtained.

TABLE 11

Anode active material: silicon.

| | | Electrolytic solution | | | | Ambient temperature cycle discharge capacity retention ratio (%) | High temperature storage discharge capacity retention ratio (%) |
|---|---|---|---|---|---|---|---|
| | | | Solvent | | | | |
| | Anode Metal material | Electrolyte salt (mol/kg) | Type | Ester carbonate halide Type | Sulfone compound Type | wt % | | |
| Example 1-4 | — | LiPF$_6$: 1 | EC + DEC | FEC | Chemical formula 4-(1) | 1 | 68 | 84 |
| Example 11-1 | Co | | | | | | 90 | 90 |
| Example 11-2 | | | | t-DFEC | | | 92 | 90 |
| Comparative example 1-1 | — | LiPF$_6$: 1 | EC + DEC | — | — | — | 52 | 74 |
| Comparative example 1-2 | | | | FEC | | | 60 | 78 |
| Comparative example 1-3 | | | | — | Chemical formula 4-(1) | 1 | 54 | 78 |
| Comparative example 11-1 | Co | | | — | — | | 65 | 80 |
| Comparative example 11-2 | | | | FEC | | | 85 | 85 |
| Comparative example 11-3 | | | | DFEC | | | 88 | 85 |

As shown in Table 11, in the case where the metal material was formed, a result similar to the results shown in Table 1 and Table 2 was obtained as well. That is, in Examples 11-1 and 11-2 in which the solvent contained both the compound of Chemical formula 4-(1) and FEC or the like, compared to Comparative examples 1-1 to 1-3 and 11-1 to 11-3 in which the solvent contained neither thereof, the ambient temperature cycle discharge capacity retention ratio and the high temperature storage discharge capacity retention ratio were higher as in Example 1-4.

In particular, in Example 11-1 in which the metal material was formed, compared to Example 1-4, the ambient temperature cycle discharge retention ratio and the high temperature storage discharge capacity retention ratio were higher.

Only the result in the case where the cobalt plating film was formed as a metal material is herein shown, but no results in the case where a plating film of iron, nickel, zinc, or copper is formed are herein shown. However, the plating film of iron or the like fulfills a function to increase the ambient temperature cycle discharge capacity retention ratio and the high temperature storage discharge capacity retention ratio as the cobalt plating film or the like does. Thus, it is evident that in the case where the former is used, effect similar to that in the case where the latter is used is obtained. The same is applied to a case that a given mixture obtained by mixing two or more of the foregoing series of plating films is used.

Accordingly, it was confirmed that in the secondary battery of an embodiment of the invention, in the case where the metal material was formed, the cycle characteristics and the storage characteristics were improved as well. In addition, it was confirmed that in the case where the metal material was formed, the characteristics were more improved.

Example 12-1

A procedure was performed in the same manner as that of Example 1-4, except that in forming the anode active material layer 34B, after the plurality of anode active material particles were formed, a cobalt (Co) plating film was grown as a metal material by electrolytic plating method by the procedure described in Examples 10-1 and 11-1.

Example 12-2

A procedure was performed in the same manner as that of Example 12-1, except that as an ester carbonate halide, t-DFEC was used instead of FEC.

Comparative Example 12-1

A procedure was performed in the same manner as that of Example 12-1, except that neither the compound shown in Chemical formula 4-(1) nor FEC was used.

Comparative Examples 12-2 and 12-3

A procedure was performed in the same manner as that of Examples 12-1 and 12-2, except that the compound shown in Chemical formula 4-(1) was not used.

The cycle characteristics and the storage characteristics for the secondary batteries of Examples 12-1 and 12-2 and Comparative examples 12-1 to 12-3 were examined. The results shown in Table 12 were obtained.

TABLE 12

Anode active material: silicon

| | Anode | | Electrolytic solution | | | | | Ambient temperature cycle discharge capacity retention ratio (%) | High temperature storage discharge capacity retention ratio (%) |
|---|---|---|---|---|---|---|---|---|---|
| | Oxide-containing film | Metal material | Electrolyte salt (mol/kg) | Solvent | | | | | |
| | | | | Type | Ester carbonate halide Type | Sulfone compound Type | wt % | | |
| Example 1-4 | — | — | LiPF$_6$: 1 | EC + DEC | FEC | Chemical formula 4-(1) | 1 | 68 | 84 |
| Example 12-1 | SiO$_2$ | Co | | | | | | 94 | 92 |
| Example 12-2 | | | | | t-DFEC | | | 95 | 93 |
| Comparative example 1-1 | — | — | LiPF$_6$: 1 | EC + DEC | — | — | — | 52 | 74 |
| Comparative example 1-2 | | | | | FEC | | | 60 | 78 |
| Comparative example 1-3 | | | | | — | Chemical formula 4-(1) | 1 | 54 | 78 |
| Comparative example 12-1 | SiO$_2$ | Co | | | — | — | | 72 | 84 |
| Comparative example 12-2 | | | | | FEC | | | 91 | 90 |
| Comparative example 12-3 | | | | | DFEC | | | 92 | 90 |

As shown in Table 12, in the case where both the oxide-containing film and the metal material were formed, a result similar to the results shown in Table 1 and Table 2 was obtained as well. That is, in Examples 12-1 and 12-2 in which the solvent contained both the compound of Chemical formula 4-(1) and FEC, compared to Comparative examples 1-1 to 1-3 and 12-1 to 12-3 in which the solvent contained neither thereof, the ambient temperature cycle discharge capacity retention ratio and the high temperature storage discharge capacity retention ratio were higher as in Example 1-4.

In particular, in Example 12-1 in which both the oxide-containing film and the metal material were formed, compared to Example 1-4 in which neither thereof was formed or Examples 10-1 and 11-1 in which only one thereof was formed, the ambient temperature cycle discharge retention ratio and the high temperature storage discharge capacity retention ratio were higher. Further, in the case where only one of the oxide-containing film and the metal material was formed, in Example 10-1 in which only the oxide-containing film was formed, the ambient temperature cycle discharge capacity retention ratio and the high temperature storage discharge capacity retention ratio were higher compared to Example 11-1 in which only the metal material was formed.

Accordingly, it was confirmed that in the secondary battery of the invention, in the case where both the oxide-containing film and the metal material were formed, the cycle characteristics and the storage characteristics were improved as well. In addition, it was confirmed that in the case where both thereof were formed, the characteristics were more improved than in the case where only one thereof was formed. In addition, it was confirmed that in the case where only one of the oxide-containing film and the metal material was formed, the characteristics were more improved with the use of the oxide-containing film than with the use of the metal material.

From the results of Table 1 to Table 12, it was confirmed that in the secondary battery of an embodiment of the invention, in the case where the solvent of the electrolytic solution contained the sulfone compound shown in Chemical formula 1, and at least one of the chain ester carbonate having halogen shown in Chemical formula 2 and the cyclic ester carbonate having halogen shown in Chemical formula 3, the cycle characteristics and the storage characteristics were improved independently of the anode active material type, the solvent composition, the electrolyte salt type or the like.

In this case, compared to a case where the carbon material (artificial graphite) was used as an anode active material, in the case where the material that is capable of inserting and extracting lithium and that has at least one of metal elements and metalloid elements (silicon and the SnCoC-containing material) was used as an anode active material, the increase ratio of the discharge capacity retention ratio was larger. Accordingly, it was confirmed that in the latter case, higher effect was obtained than in the former case. It is conceivable that it resulted from the following. That is, in the case where silicon or the like advantageous to realizing a high capacity was used as an anode active material, the electrolytic solution is easily decomposed compared to in a case that the carbon material was used. Thereby, decomposition inhibition effect of the electrolytic solution was significantly demonstrated.

The invention has been described with reference to the embodiment and the examples. However, the invention is not limited to the aspects described in the foregoing embodiment and the foregoing examples, and various modifications may be made. For example, use application of the electrolytic solution of the invention is not always limited to the secondary battery, but may be an electrochemical device other than the secondary battery. As other use application, for example, a capacitor and the like are cited.

Further, in the foregoing embodiment and the foregoing examples, the description has been given of the lithium ion secondary battery in which the anode capacity is expressed based on inserting and extracting lithium, or the lithium metal secondary battery in which the anode capacity is expressed based on precipitation and dissolution of lithium, as a secondary battery type. However, the secondary battery of the invention is not limited thereto. The invention is able to be similarly applied to a secondary battery in which the anode capacity includes the capacity associated with inserting and extracting lithium and the capacity associated with precipitation and dissolution of lithium, and the anode capacity is expressed by the sum of these capacities. In this secondary battery, a material capable of inserting and extracting lithium is used as an anode active material, and the chargeable capacity in the anode material capable of inserting and extracting lithium is set to a smaller value than that of the discharge capacity of the cathode.

Further, in the foregoing embodiment and the foregoing examples, the description has been given with the specific examples of the cylindrical or laminated film secondary battery as a battery structure, and with the specific example in which the battery element has the spirally wound structure as a battery structure. However, the secondary battery of the invention is able to be similarly applied to a battery having other battery structure such as a square battery, a coin type battery, and a button type battery or a battery in which the battery element has other structure such as a lamination structure.

Further, in the foregoing embodiment and the foregoing examples, the description has been given of the case using lithium as an electrode reactant. However, as an electrode reactant, other Group 1 element such as sodium (Na) and potassium (K), a Group 2 element such as magnesium (Mg) and calcium (Ca), or other light metal such as aluminum may be used. In this case, the anode material described in the foregoing embodiment is able to be used as an anode active material as well.

Furthermore, in the foregoing embodiment and the foregoing examples, for the content of the sulfone compound shown in Chemical formula 1 in the electrolytic solution or in the secondary battery of the invention, the appropriate range derived from the results of the examples has been described. However, such a description does not totally eliminate the possibility that the content may be out of the foregoing range. That is, the foregoing appropriate range is the range particularly preferable for obtaining the effects of the invention. Therefore, as long as effect of the invention is obtained, the content may be out of the foregoing range in some degrees.

It should be understood by those skilled in the art that various modifications, combinations, sub-combinations and alternations may occur depending on design requirements and other factors insofar as they are within the scope of the appended claims or the equivalents thereof.

What is claimed is:

1. A secondary battery comprising:
   a cathode;
   an anode; and
   an electrolytic solution,
      wherein,
         the electrolytic solution contains a solvent containing (a) a sulfone compound shown in Chemical formula 1 and (b) at least one of a chain ester carbonate having halogen shown in Chemical formula 2 and (c) a cyclic ester carbonate having halogen shown in Chemical formula 3, where Chemical formula 1 to Chemical formula 3 being:

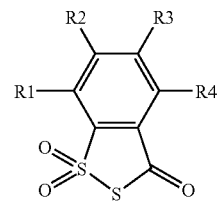

Chemical formula 1 where each of R1 to R4 represent a hydrogen group, a halogen group, an alkyl group, an alkyl halide group, an alkoxy group, or an alkoxy halide group,

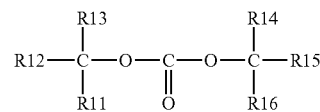

Chemical formula 2 where each of R11 to R16 represent a hydrogen group, a halogen group, an alkyl group, or an alkyl halide group, at least one of R11 to R16 is the halogen group or the alkyl halide group, and

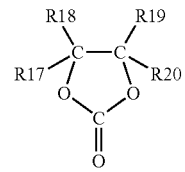

Chemical formula 3 where each of R17 to R20 represent a hydrogen group, a halogen group, an alkyl group, or an alkyl halide group, at least one of R17 to R20 is the halogen group or the alkyl halide group.

2. The secondary battery according to claim 1, wherein the halogen group in the Chemical formula 1 is a fluorine group, and the alkyl halide group or the alkoxy halide group is a fluorinated alkyl group or a fluorinated alkoxy group.

3. The secondary battery according to claim 1, wherein a content of the sulfone compound shown in the Chemical formula 1 in the solvent is in the range from 0.01 wt % to 5 wt %.

4. The secondary battery according to claim 1, wherein the solvent contains at least one of a cyclic ester carbonate having an unsaturated bond shown in Chemical formula 4 to Chemical formula 6, sultone and an acid anhydride, chemical formulae 4 to 6 being:

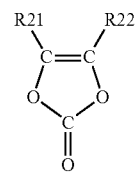

Chemical formula 4 where each of R21 and R22 represent a hydrogen group or an alkyl group;

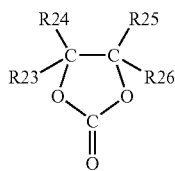

Chemical formula 5 where each of R23 to R26 represent a hydrogen group, an alkyl group, a vinyl group, or an aryl group, at least one of R23 to R26 is the vinyl group or the aryl group;

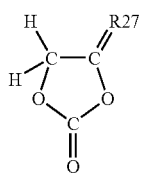

Chemical formula 6 where R27 is an alkylene group.

5. The secondary battery according to claim 4, wherein the cyclic ester carbonate having an unsaturated bond shown in the Chemical formula 4 is vinylene carbonate, the cyclic ester carbonate having an unsaturated bond shown in the Chemical formula 5 is vinylethylene carbonate, and the cyclic ester carbonate having an unsaturated bond shown in the Chemical formula 6 is methylene ethylene carbonate.

6. The secondary battery according to claim 1, wherein the electrolytic solution contains an electrolyte salt containing at least one selected from the group consisting of lithium hexafluorophosphate ($LiPF_6$), lithium tetrafluoroborate ($LiBF_4$), lithium perchlorate ($LiClO_4$), lithium hexafluoroarsenate ($LiAsF_6$), compounds shown in Chemical formula 7 to Chemical formula 9, and compounds shown in Chemical formula 10 to Chemical formula 12, chemical formulae 7 to 12 being:

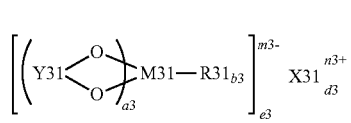

Chemical formula 7 where X31 is a Group 1 element or a Group 2 element in the long period periodic table or aluminum (Al), M31 is a transition metal element, a Group 13 element, a Group 14 element, or a Group 15 element in the long period periodic table, R31 is a halogen group, Y31 is —(O=)C—R32-C(=O)—, —(O=)C—C(R33)$_2$-, or —(O=)C—C(=O)—, R32 is an alkylene group, an alkylene halide group, an arylene group, or an arylene halide group, R33 is an alkyl group, an alkyl halide group, an aryl group, or an aryl halide group, a3 is one of integer numbers 1 to 4, b3 is 0, 2, or 4, c3, d3, m3, and n3 are one of integer numbers 1 to 3;

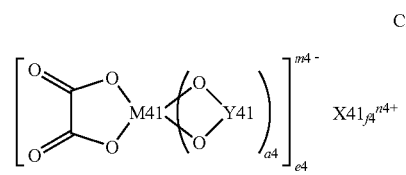

Chemical formula 8 where X41 is a Group 1 element or a Group 2 element in the long period periodic table. M41 is a transition metal element, a Group 13 element, a Group 14 element, or a Group 15 element in the long period periodic table, Y41 is —(O=)C—(C(R41)$_2$)$_{b4}$-C(=O)—, —(R43)$_2$C—(C(R42)$_2$)$_{c4}$-C(=O)—, —(R43)$_2$C—(C(R42)$_2$)$_{c4}$-C(R43)$_2$-, —(R43)$_2$C—(C(R42)$_2$)$_{c4}$-S(=O)$_2$—, —(O=)$_2$S—(C(R42)$_2$)$_{d4}$-S(=O)$_2$—, or —(O=)C—(C(R42)$_2$)$_{d4}$-S(=O)$_2$—, each of R41 and R43 are a hydrogen group, an alkyl group, a halogen group, or an alkyl halide group, at least one of R41/R43 is respectively the halogen group or the alkyl halide group, R42 is a hydrogen group, an alkyl group, a halogen group, or an alkyl halide group, a4, e4, and n4 are 1 or 2, b4 and d4 are one of integer numbers 1 to 4, c4 is one of integer numbers 0 to 4, f4 and m4 are one of integer numbers 1 to 3;

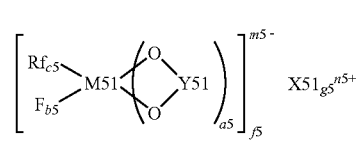

Chemical formula 9 where X51 is a Group 1 element or a Group 2 element in the long period periodic table. M51 is a transition metal element, a Group 13 element, a Group 14 element, or a Group 15 element in the long period periodic table, Rf is a fluorinated alkyl group with the carbon number in the range from 1 to 10 or a fluorinated aryl group with the carbon number in the range from 1 to 10, Y51 is —(O=)C—(C(R51)$_2$)$_{d5}$-C(=O)—, —(R52)$_2$C—(C(R51)$_2$)$_{d5}$-C(=O)—, —(R52)$_2$C—(C(R51)$_2$)$_{d5}$-C(R52)$_2$-, —(R52)$_2$C—(C(R51)$_2$)$_{d5}$-S—(=O)$_2$—, —(O=)$_2$S—(C(R51)$_2$)$_{e5}$-S(=O)$_2$—, or —(O=)C—(C(R51)$_2$)$_{e5}$-S(=O)$_2$—, R51 is a hydrogen group, an alkyl group, a halogen group, or an alkyl halide group, R52 is a hydrogen group, an alkyl group, a halogen group, or an alkyl halide group, and at least one thereof is the halogen group or the alkyl halide group, a5, f5, and n5 are 1 or 2, b5, c5, and e5 are one of integer numbers 1 to 4, d5 is one of integer numbers 0 to 4, g5 and m5 are one of integer numbers 1 to 3;

$LiN(C_mF_{2m+1}SO_2)(C_nF_{2n+1}SO_2)$  Chemical formula 10 where m and n are an integer number of 1 or more;

Chemical formula 11

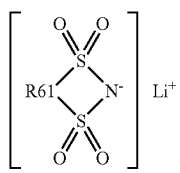

where R61 is a straight chain/branched perfluoro alkylene group with the carbon number in the range from 2 to 4;

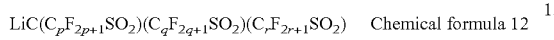

where p, q, and r are an integer number of 1 or more.

7. The secondary battery according to claim 6, wherein the compound shown in the Chemical formula 7 is a compound shown in Chemical formulas 13-(1) to 13-(6), the compound shown in the Chemical formula 8 is a compound shown in Chemical formulas 14-(1) to 14-(8), and the compound shown in the Chemical formula 9 is a compound shown in Chemical formula 15, chemical formulae 13-(1) to 13-(6), 14-(1) to 14-(8) and 15 being:

Chemical formula 13

(1)
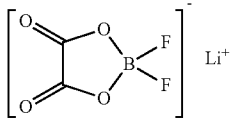

(2)
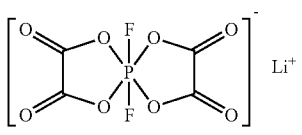

(3)
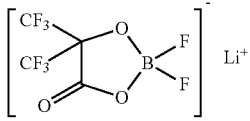

(4)
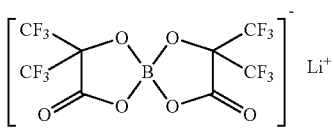

(5)
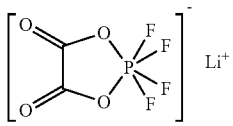

(6)
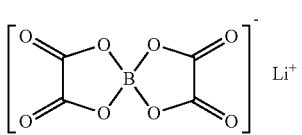

Chemical formula 14

(1)
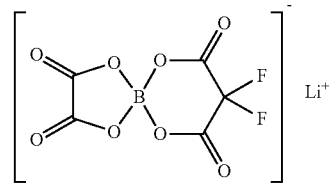

(2)
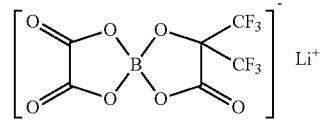

(3)
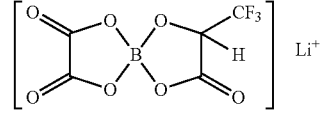

(4)
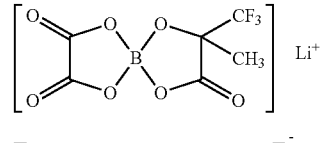

(5)
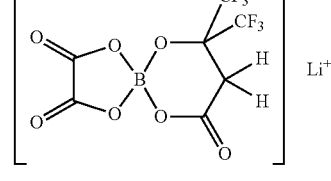

(6)
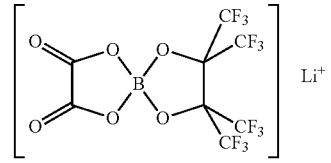

(7)
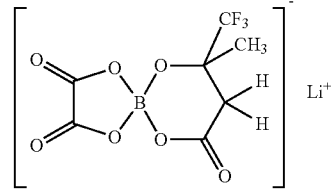

(8)
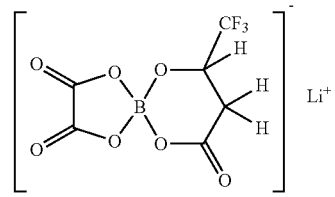

Chemical formula 15

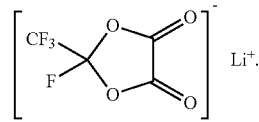

8. The secondary battery according to claim 1, wherein the anode contains an anode active material containing a carbon material, lithium metal (Li), or a material that is capable of inserting and extracting lithium and has at least one of metal elements and metalloid elements.

9. The secondary battery according to claim 1, wherein the anode has an anode active material layer containing a plurality of anode active material particles, and the anode active material layer has a metal material not being alloyed with an electrode reactant that is provided in a gap therein.

10. The secondary battery according to claim 9, wherein the metal material is provided in a gap between the anode active material particles.

11. The secondary battery according to claim 9, wherein the anode active material particles have a multilayer structure in the particles, and the metal material is provided in a gap in the anode active material particles.

12. The secondary battery according to claim 9, wherein the metal material contains at least one of iron (Fe), cobalt (Co), nickel (Ni), zinc (Zn), and copper (Cu).

13. An electrolytic solution that contains a solvent containing a sulfone compound shown in chemical formula 16 and at least one of a chain ester carbonate having halogen shown in Chemical formula 17 and a cyclic ester carbonate having halogen shown in Chemical formula 18, chemical formulae 16 and 17 being:

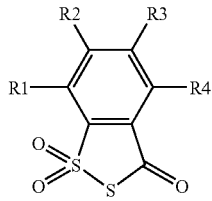

Chemical formula 16 where each of R1 to R4 represent a hydrogen group, a halogen group, an alkyl group, an alkyl halide group, an alkoxy group, or an alkoxy halide group,

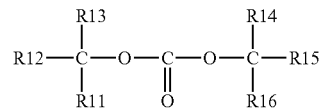

Chemical formula 17 where each of R11 to R16 represent a hydrogen group, a halogen group, an alkyl group, or an alkyl halide group, at least one of R11 to R16 is the halogen group or the alkyl halide group,

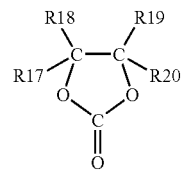

Chemical formula 18 where each of R17 to R20 represent a hydrogen group, a halogen group, an alkyl group, or an alkyl halide group, at least one of R17 to R20 is the halogen group or the alkyl halide group.

14. The electrolytic solution according to claim 13 used for a secondary battery.

* * * * *